United States Patent
Riley et al.

(10) Patent No.: US 9,189,552 B2
(45) Date of Patent: Nov. 17, 2015

(54) MODIFYING A CUSTOM SEARCH ENGINE FOR A WEB SITE BASED ON CUSTOM TAGS

(71) Applicant: SWIFTYPE, INC., San Francisco, CA (US)

(72) Inventors: Matthew T. Riley, San Francisco, CA (US); Quinlan J. Hoxie, San Francisco, CA (US)

(73) Assignee: Swiftype, Inc., San Francisco, CA (US)

( * ) Notice: Subject to any disclaimer, the term of this patent is extended or adjusted under 35 U.S.C. 154(b) by 98 days.

(21) Appl. No.: 13/667,493

(22) Filed: Nov. 2, 2012

(65) Prior Publication Data

US 2014/0129540 A1 May 8, 2014

(51) Int. Cl.
*G06F 17/30* (2006.01)
*G06F 3/0481* (2013.01)

(52) U.S. Cl.
CPC ........ *G06F 17/30864* (2013.01); *G06F 3/0481* (2013.01); *G06F 17/30* (2013.01)

(58) Field of Classification Search
CPC .............. G06Q 30/02; G06F 17/30864; G06F 17/3089
See application file for complete search history.

(56) References Cited

U.S. PATENT DOCUMENTS

| | | | | |
|---|---|---|---|---|
| 6,421,675 B1* | 7/2002 | Ryan et al. | ............................ | 1/1 |
| 7,698,261 B1* | 4/2010 | Khoshnevisan | ....... | 707/999.003 |
| 8,620,891 B1* | 12/2013 | Thirumalai | ................... | 707/705 |
| 2004/0078224 A1* | 4/2004 | Schramm-Apple et al. | ...... | 705/2 |
| 2008/0016098 A1* | 1/2008 | Frieden et al. | ................. | 707/102 |
| 2008/0082904 A1* | 4/2008 | Martinez et al. | ............... | 715/205 |
| 2008/0201348 A1* | 8/2008 | Edmonds et al. | ............. | 707/101 |
| 2009/0106202 A1* | 4/2009 | Mizrahi | ............................ | 707/3 |
| 2009/0138458 A1* | 5/2009 | Wanker | ............................. | 707/5 |
| 2009/0254529 A1* | 10/2009 | Goldentouch | .................... | 707/3 |

OTHER PUBLICATIONS

"Google Enterprise Search"; 3 pages; Obtained from Internet: http://www.google.com/enterprise/search/products_gss_features.html; retrieval date: Oct. 10, 2012.

"Google Search Appliance"; 4 pages; Obtained from Internet: https://developers.google.com/search-appliance/documentation/50/help_gsa/serve_keymatch; retrieval date: Oct. 10, 2012.

* cited by examiner

*Primary Examiner* — Mariela Reyes
*Assistant Examiner* — Courtney Harmon
(74) *Attorney, Agent, or Firm* — Meyertons Hood Kivlin Kowert & Goetzel, P.C.; Jeffrey C. Hood; Joel L. Stevens

(57) ABSTRACT

Automatically creating and modifying a search engine for a website. User input may be received specifying an address of a website. A search engine may be automatically created for the website based on the user input. Webpages of the website may specify a plurality of tags specifying custom attributes of the webpages. During creation of the search engine, these custom attributes may be incorporated into the search engine index. Additional user input may be received customizing the search engine for various search engine contexts, e.g., based on the custom attributes of the webpages. Search engine results for the website may be based on various ranking functions, potentially including social impact of webpages of the website.

20 Claims, 37 Drawing Sheets

| Home |
| Essays |
| H&P |
| Books |
| News |
| YC |
| School |
| Arc |
| Lisp |
| Spam |
| FAQs |
| RAQs |
| Quotes |
| RSS |
| Bio |
| Search |
| Index |

WHAT STARTUPS ARE REALLY LIKE

Want to start a startup? Get funded by Y Combinator

October 2009

(This essay is derived from a talk at the 2009 Startup School.)

I wasn't sure what to talk about at Startup School, so I decided to ask the founders of the startups we'd funded. What hadn't I written about yet?

I'm in the unusual position of being able to test the essays I write about startups. I hope the ones on other topics are right, but I have no way to to them. The ones on startups get tested by about 70 people every 6 months.

So I sent all the founders an email asking what surprised them about starting a startup. This amounts to asking what I got wrong, because if I'd explained things well enough, nothing should have surprised them.

I'm proud to report I got one response saying:

> What surprised me the most is that everything was actually fairly predictable!

The bad news is that I got over 100 other responses listing the surprises they encountered.

There were very clear patterns in the responses; it was remarkable how often several people had been surprised by exactly the same thing. These were the biggest:

1. Be Careful with Cofounders

This was the surprise mentioned by the most founders. There were two types of responses: that you have to be careful who you pick as a cofounder, and that you have to work hard to maintain your relationship.

What people wished they'd paid more attention to when choosing cofounders was character and commitment, not ability. This was particularly true with startups that failed. The lesson: don't pick cofounders who will flake.

Here's a typical response:

> You haven't seen someone's true colors unless you've worked with them on a startups

FIG. 31 swiftype

| Pages | Domains | Result Controls | Analytics | Install |

Home    Documentation    Account Settings    Logout

Manage Domain
Update White and Black List rules for mathewriley.com. For more information visit Path and White Lists.

[Whitelist ▼] URLs which [begin with ▼] [/example/path]    [ADD]    [RECRAWL]

Whitelist Rule

| | Type | |
|---|---|---|
| /new | Prefix | delete |
| video | Substring | delete |

Blacklist Rule

| | Type | |
|---|---|---|
| .external | Suffix | delete |
| old | Substring | delete |
| pdf | Substring | delete |

FIG. 3K

FIG. 3M swiftype

Home    Documentation    Account Settings    Logout

| Pages | Domains | Result Controls | Analytics |

22,236    9,471
TOTAL SEARCHES    TOTAL AUTOSELECTS

☑ Install                                    REMOVE THIS PAGE

Number of Searches                        Timeframe (last 14 days) ▲

[Line chart from Sep 25 to Oct 8, y-axis 0 to 200]

Top Searches

| Query | No. Searches |
|---|---|
| m 408n | 229 |
| evans | 156 |
| ugs 303 | 123 |
| smith | 121 |
| ugs 302 | 89 |
| colapret | 85 |
| david | 79 |
| miller | 74 |
| bio 326m | 74 |
| bio | 72 |

1 2 3 4 5 — Next> Last>>

Top Searches with No Results

| Query | No. Searches |
|---|---|
| kalahurka | 21 |
| ciperiani | 21 |
| atlasse | 20 |
| wiseman | 20 |
| caputo | 19 |
| mccord | 19 |
| workman | 17 |
| meth | 16 |
| colapret | 15 |
| wilks | 14 |

1 2 3 4 5 — Next> Last>>

FIG. 3N

FIG. 3P swiftype

Pages | Domains | Result Controls | Analytics | Install

Home   Documentation   Account Settings   Logout

Manage your Search Engine
Select a page below to modify it.

[ SHOW PREVIEW ]   [ DELETE THIS ENGINE ]

| Page Title | |
|---|---|
| Trevor with Powerbooks<br>http://www.paulgraham.com/tibmac.html | edit |
| *Fuzzwich*<br>http://www.paulgraham.com/Fuzzwich.html | edit |
| Paul Graham Index<br>http://www.paulgraham.com/ind_10.html | edit |
| *Zings*<br>http://www.paulgraham.com/illus.html | edit |
| Paul Graham Index<br>http://www.paulgraham.com/ind_4.html | edit |
| *Federico da Montefeltro*<br>http://www.paulgraham.com/montefeltro.html | edit |
| Womb Chair<br>http://www.paulgraham.com/womb.html | edit |
| *Lisp Code*<br>http://www.paulgraham.com/lispcode.html | edit |
| Nerd Ad<br>http://www.paulgraham.com/nerdad.html | edit |
| *Aaron, Steve, Zak with Powerbooks*<br>http://www.paulgraham.com/aarstevzakwi.html | edit |
| Spam Links<br>http://www.paulgraham.com/spamlinks.html | edit |
| *Nominally Denver, 2004*<br>http://www.paulgraham.com/denver.html | edit |

FIG. 3Q swiftype

Pages  Domains  Result Controls  Analytics  Install

Home  Documentation  Account Settings  Logout

Edit Page Details
Update page info below amd it will be immediately reflected in your search index.

REMOVE THIS PAGE

URL  http://www.paulgraham.com/tlbmac.html
TITLE  Trevor with Powerbooks

UPDATE PAGE

Top Referring Queries

| Query | Clickthrough Count |
|---|---|
| No clickthrough data yet. | |

FIG. 8A

FIG. 8B (✦) swiftype

Home    Documentation 🗗    Account Settings    Logout

| Pages | Domains | Result Controls | Analytics | Install |

Manage your Search Result rankings
Search your site using the search box below, then re-order the results to your liking.

SEARCH THIS ENGINE [ startups ]                                    [ SEARCH ]

■ Drag-and-drop results to ( PIN ) them in place.                   Add a custom result

What Startups Are Really Like (UNPIN)                                    0        ⊗
http://www.paulgraham.com/really.html 🗗                                     CLICKS   ▬
the 2009 Startup School.)"I wasn't sure what to talk about at Startup School, so I decided to ask the
founders of the startups we'd funded. What hadn't I written about yt? I'm in the unusual position of
being able to test the essays I write about star...

Ideas for Startups                                                      0        ⊗
http://www.paulgraham.com/ideas.html 🗗                                     CLICKS   ▬
2005 Startup School.)How do you get good ideas for startups? That's probably the number one
question people ask me. I'd like to reply with another question: why do people think it's hard to come
up with ideas for startups? That might seem a stupid thing to a...

Startups in 13 Sentences                                                0        ⊗
http://www.paulgraham.com/13sentences.html 🗗                               CLICKS   ▬
for a startup what location is for real estate. You can change anything about a house except where
it is. In a startup you can change your idea easily, but changing your cofounders is hard. [1] And the
success of a startup is almost always a function of its founders. 2...

The Future of Web Startups                                              0        ⊗
http://www.paulgraham.com/webstartups.html 🗗                               CLICKS   ▬
produced by startups, this pattern is happening to startups. It's so cheap to start web startups
that orders of magnitudes more will be started. If the pattern holds true, that should cause dramatic
changes. 1. lots of StartupsSo my first prediction about the future....

Why Startups Condense in America                                        0        ⊗
http://www.paulgraham.com/america.html 🗗                                   CLICKS   ▬
creating startups in Europe is the attitude toward employment. The famously rigid labor laws hurt every
company, but startups especially, because startups have the least time to spare for bureaucratic hassles.
The difficulty of hiring people is a particular problem for <...

The Student's Guide to Startups                                         0        ⊗
http://www.paulgraham.com/mit.html 🗗                                       CLICKS   ▬
start a startup just one year later, after you graduate, as long as you're not accepted to grad school in the
fall the startup reads to everyone as your occupation. You're now a startup founder, so you have to do
well at that. For nearly everyone, the opinion of...

The Future of Web Startups (Original Version)                           0        ⊗
http://www.paulgraham.com/webstartups-org.html 🗗
produced by startups, this pattern is happening to startups. It's so cheap to start web startups that swiftype

Home    Documentation ☑    Account Settings    Logout

| Pages | Domains | Result Controls | Analytics | Install |

Manage your Search Result rankings
Search your site using the search box below, then re-order the results to your liking.

SEARCH THIS ENGINE [ startups ]    [ Add a custom result ]    ( SEARCH )

- Drag-and-drop results to (PIN) them in place. (UNPIN)

What Startups Are Really Like
http://www.paulgraham.com/really.html ☑
the 2009 Startup School.) I wasn't sure what to talk about at Startup School, so I decided to ask the founders of the startups we'd funded. What hadn't I written about yet? I'm in the unusual position of being able to test the essays I write about star...
0 CLICKS    —    ⊗

Ideas for Startups
http://www.paulgraham.com/ideas.html ☑
2005 Startup School.)How do you get good ideas for startups? That's probably the number one question people ask me. I'd like to reply with another question: why do people think it's hard to come up with ideas for startups? That might seem a stupid thing to a...
0 CLICKS    —    ⊗

Startups in 13 Sentences
http://www.paulgraham.com/13sentences.html ☑
for a startup what location is for real estate. You can change anything about a house except where it is. In a startup you can change your idea easily, but changing your cofounders is hard. [1] And the success of a startup is almost always a function of its founders. 2...
0 CLICKS    —    ⊗

The Future of Web Startups
http://www.paulgraham.com/webstartups.html ☑
produced by startups, this pattern is happening to startups. It's so cheap to start web startups that orders of magnitudes more will be started. If the pattern holds true, that should cause dramatic changes. 1. lots of StartupsSo my first prediction about the future...
0 CLICKS    —    ⊗

Why Startups Condense in America
http://www.paulgraham.com/america.html ☑
creating startups in Europe is the attitude toward employment. The famously rigid labor laws hurt every company, but startups especially, because startups have the least time to spare for bureaucratic hassles, The difficulty of firing people is a particular problem for <...
0 CLICKS    —    ⊗

The Student's Guide to Startups
http://www.paulgraham.com/mit.html ☑
start a startup just one year later, after you graduate, as long as you're not accepted to grad school in the fall the startup reads to everyone as your occupation. You're now a startup founder, so you have to do well at that. For nearly everyone, the opinion of...
0 CLICKS    —    ⊗

The Future of Web Startups (Original Version)
http://www.paulgraham.com/webstartups-orig.html ☑
produced by startups, this pattern is happening to startups. It's so cheap to start web startups that
0    —    ⊗

FIG. 8H swiftype      Home    Documentation    Account Settings    Logout

| Pages | Domains | Result Controls | Analytics | Install |

Manage your Search Result rankings
Search your site using the search box below, then re-order the results to your liking.

SEARCH THIS ENGINE [ startups ]   [ SEARCH ]

🗑 You have removed results from this search. Manage Remove Results.

▬ Drag-and-drop results to (PIN) them in place.     Add a custom result

Lisp History (UNPIN) 🔗
http://www.paulgraham.com/lisphistory.html 🔗
Fortran the Roots of LispWhat Made Lisp DifferentEvolution of LispHistory of Tpaergon File EntryThe Syntax QuestionCarl De MarckenInside OrbitzDan Weinreb.LoopDoug McIlroy. McCarthy Presents Lisp.    0 CLICKS   —   ⊗

What Startups Are Really Like (UNPIN) 🔗
http://www.paulgraham.com/really.html 🔗
the 2009 Startup School.) I wasn't sure what to talk about at Startup School, so I decided to ask the founders of the startups we'd funded. What hadn't I written about it? I'm in the unusual position of being able to test the essays I write about start...    0 CLICKS   —   ⊗

Ideas for Startups
http://www.paulgraham.com/ideas.html 🔗
2005 Startup School.) How do you get good ideas for startups? That's probably the number one question people ask me. I'd like to reply with another question: why do people think it's hard to come up with ideas for startups? That might seem a stupid thing to a...    0 CLICKS   —   ⊗

The Future of Web Startups
http://www.paulgraham.com/webstartups.html 🔗
produced by startups, this pattern is happening to startups. It's so cheap to start web startups that orders of magnitudes more will be started. If the pattern holds true, that should cause dramatic changes. 1. lots of StartupsSo my first prediction about the future...    0 CLICKS   —   ⊗

Why Startups Condense in America
http://www.paulgraham.com/america.html 🔗
creating startups in Europe is the attitude toward employment. The famously rigid labor laws hurt every company, but startups especially, because startups have the least time to spare for bureaucratic hassles, The difficulty of firing people is a particular problem for <...    0 CLICKS   —   ⊗

The Student's Guide to Startups
http://www.paulgraham.com/mit.html 🔗
start a startup just one year later, after you graduate, as long as you're not accepted to grad school in the fall the startup reads to everyone as your occupation. You're now a startup founder, so you have to do well at that. For nearly everyone, the opinion of...    0 CLICKS   —   ⊗

FIG. 8I

| | Pages | Domains | Result Controls | Analytics | Settings | Install |
|---|---|---|---|---|---|---|

Engine Settings
Update custom queries for your search engine. See documentation for customizing queries here.

Custom Result Ranking Functions

| Name | Factors | Active | Created |
|---|---|---|---|
| Primary Full Search | Engagement, Popularity, CPM | true | 9 months ago |
| Primary Autocomplete | Engagement, Popularity, History | true | 9 months ago |
| Profile Search | Popularity, History | false | 5 days ago |

*FIG. 12*

```
<body>
This is content will not be indexed since the first rule is true.
<div data-swiftype-index='true'>
    <p>
        All content under the above div tag will be indexed.
    </p>
    <p>
        Content in this paragraph tag will be included from the search index
    </p>
    <p data-swiftype-index='false'>
        Content in this paragraph will be excluded because of the nested rule.
    </p>
</div>
</body>
```

FIG. 13

MODIFYING A CUSTOM SEARCH ENGINE FOR A WEB SITE BASED ON CUSTOM TAGS

FIELD OF THE INVENTION

The present invention relates to the field of search engines, and more particularly to a system and method for automatically creating a custom search engine for a website.

DESCRIPTION OF THE RELATED ART

In recent years, web traffic and web sites have proliferated. It is common for most companies and many users to create and maintain personal or professional web sties, including blogs, company web sites (both exposed to the Internet or hosted for internal use), etc. At the same time, search engines are extremely important for allowing users to locate relevant content of websites.

Many website managers desire the ability to allow customers or visitors to the website to search for content within that website. Currently, visitors may use a general search engine while using a "site" modifier to search a single website (e.g., using search engines such as Google®). However, website managers may wish to provide a search engine within their site rather than forcing users to use an external search engine.

Accordingly, using present solutions, managers may install their own search engine using various online tools, such as by hosting a search engine using PHP or other server-side code. These solutions typically require a more savvy manager as well as upgraded hosting that supports execution of server-side code.

Accordingly, improvements in website search engines are desired.

SUMMARY OF THE INVENTION

Various embodiments of a system and method for automatically creating and customizing a search engine for a website are presented below.

Initially, a user may provide user input requesting creation of a search engine for a website, e.g., controlled by the user. The user input may specify an address (e.g., a URI or URL of the website). In response to the user input, a search engine may be automatically created for the website, e.g., including crawling and/or indexing the website specified by the user. In some embodiments, the creation of the search engine may involve determining the social impact or influence of various pages on the website, e.g., by analyzing how many "likes" or links to webpages of the website occur on the Internet, such as on social media sites. Other characteristics of webpages within the website may also be determined and used in creating the search engine.

Once the search engine is created, code for including the search engine on the website may be automatically generated and may be provided to the user. For example, the code may be JavaScript™ code or any other browser-supported language that the user may include in the website.

After creation of the search engine, the user (or another user associated with the website) may be able to customize the search engine for the website. In one embodiment, the user may provide input specifying a search query. In response to the search query, the search engine may generate a plurality of search results and provide the plurality of search results, e.g., in a webpage or pop-up window, to the user.

The user may provide input to the search results, e.g., directly to the webpage displaying the search results, to specify modifications to the search results, and correspondingly to the search engine. For example, the user may specify a change in position of one or more of the search results, e.g., by dragging a search result from an initial position to a desired position on the screen. Alternatively, or additionally, the user may delete a search result from the plurality of search results and/or provide an additional web page that should be provided in the search results to the search query.

Based on the user input to customize the search results, the search engine may be automatically modified to incorporate the changes indicated by the user input. In one embodiment, the changes may be specific to the query provided by the user. However, the changes may also affect similar search queries (e.g., modifications for "flowers" may also apply to "flower"). Terms similar, but less related, may also be influenced, e.g., to a lesser degree.

Other mechanisms may be used for customizing the search engine. For example, the user may be able to specify different weights for various characteristics of the webpages that may be used by the search engine in determining the order of search results to a search query. For example, social importance, engagement, popularity, history, ad revenue, etc. may be used to influence the order of the search results. The user may specify the importance of each of the available categories and search results may be provided according to that specification. For example, a user may desire that pages with the most ad revenue have more importance than social importance or vice versa.

As another example, the user may be able to specify custom attributes in the webpages (e.g., the HTML of the webpages), e.g., by using tags. By using a format recognized by the search engine, these tags may be incorporated into the search engine (e.g., during indexing or crawling) and the user may use those tags to influence the search results for the website (e.g., by specifying rules that use the custom attributes specified in the web page.

BRIEF DESCRIPTION OF THE DRAWINGS

A better understanding of the present invention can be obtained when the following detailed description of the preferred embodiment is considered in conjunction with the following drawings, in which:

FIGS. 6A-7E are diagrams illustrating the evolution of exemplary search results with the customizations of FIGS. 5A-5D as changes occur in the website;

FIGS. 8A-8I illustrate an exemplary walkthrough corresponding to one embodiment of the method of FIG. 4;

FIGS. 11 and 12 are exemplary user interfaces corresponding to an embodiment of the method of FIG. 10; and FIG. 13 illustrates exemplary code for excluding indexing of a portion of a webpage.

Figure 1:
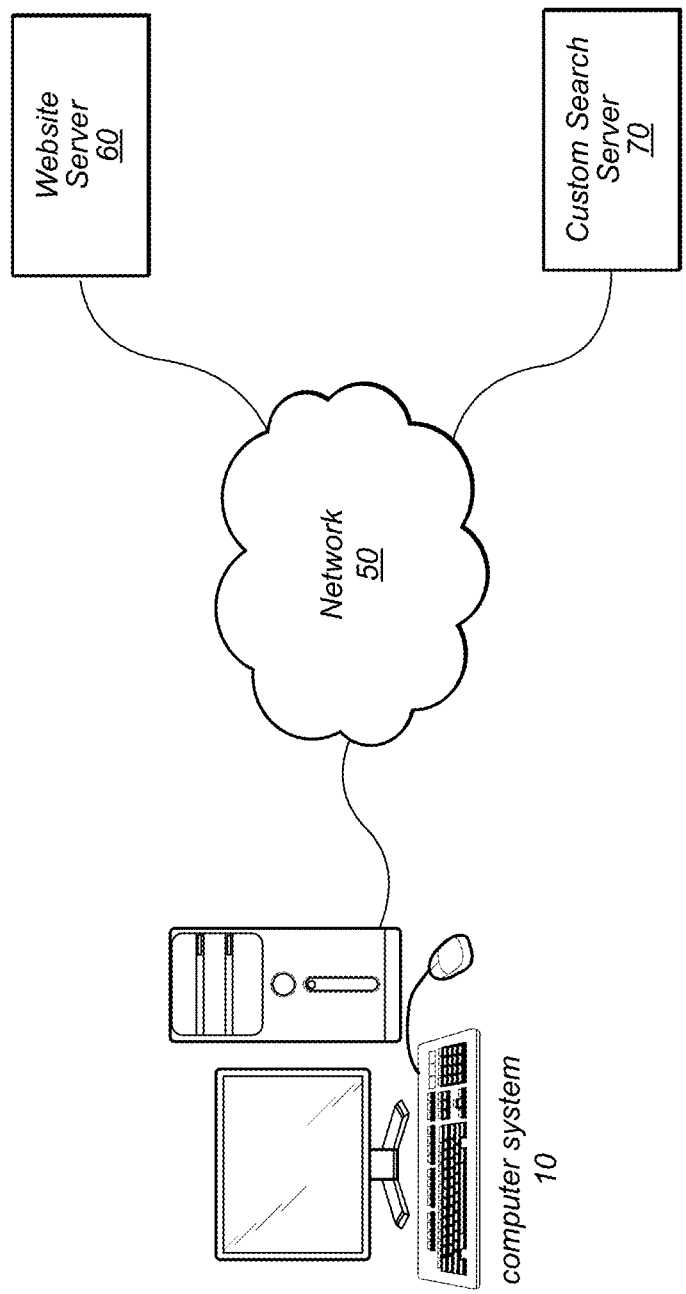
FIG. 1 illustrates a network system comprising two or more computer systems configured according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Exemplary Network

FIG. 1 illustrates a system including a first computer system 10 that is coupled to a web site server 60 and a custom search server 70. In one particular embodiment, a user may use the computer system 10 to interact with the custom search server 70 in order to add a search engine to a web site hosted by web site server 60, as described herein.

As shown in FIG. 1, the computer system 10 may include a display device operable to display a graphical user interface, e.g., of a web site maintained by the user on web site server 60 (referred to herein as the "hosted website") or of a web site provided by custom search server 70 for installing a custom search engine on the hosted web site (referred to herein as the "custom search website").

The computer system 10 and the servers 60 and 70 may include at least one memory medium on which one or more computer programs or software components according to one embodiment of the present invention may be stored. For example, the memory medium of the custom search server may store program instructions for automatically creating a search engine for the hosted website. Similarly, the computer system 10 may store program instructions for interacting with the various servers, e.g., using a web browser. Finally, the web site server 60 may store program instructions for providing the hosted website and/or associated services to users visiting the web site. The memory mediums discussed above may also store operating system software, as well as other software for operation of the computer system. Various embodiments further include receiving or storing instructions and/or data implemented in accordance with the foregoing description upon a carrier medium.

The network 50 can also be any of various types, including a LAN (local area network), WAN (wide area network), the Internet, or an Intranet, among others. In primary embodiments, the network 50 may be the Internet.

Figure 2:
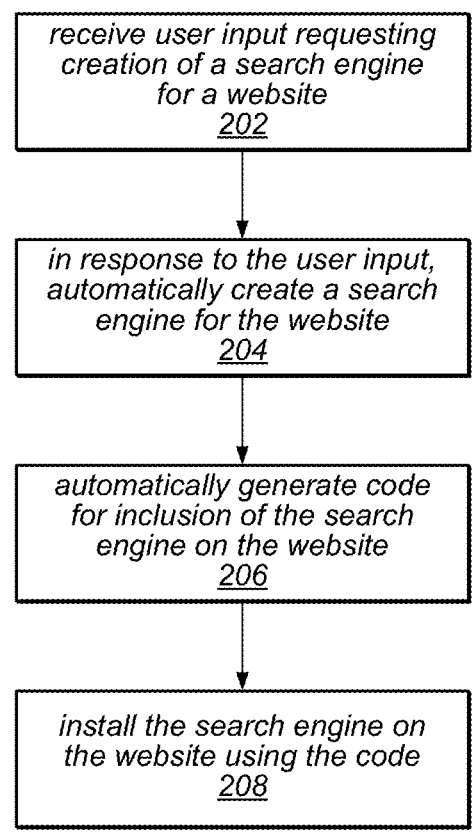
FIG. 2 is a flowchart diagram illustrating one embodiment of a method for automatically creating a custom search engine for a website.

FIG. 2—Automatically Creating a Search Engine for a Website

FIG. 2 illustrates a method for automatically creating a search engine for a website. The method shown in FIG. 2 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

Initially, in 202, user input may be received to request creation of a search engine for a website. For example, a user may use the computer system 10 to access a custom search website of the custom search server 70. The custom search server 70 may provide a webpage that allows the user to request automatic creation of the search engine. For example, the webpage may include a field where the user provides an address of a hosted website hosted by web site server 60 and/or other information for the search engine, such as a name for the search engine. Accordingly, the user may specify an address of the hosted website, e.g., by providing a URI or URL of the hosted website.

In 204, response to the user input, a search engine may be automatically created for the website, e.g., including crawling and/or indexing the website specified by the user. For example, the hosted website may be crawled and a search index may be generated based on the crawling of the hosted website.

In one embodiment, as the crawler visits pages on the hosted website, it may attempt to extract some structured information from each page. For example, the information may include the title of the page, the textual content of the page, any sections present in the page, and a number of other factors that may be relevant to search indicies. Absent any information provided on the page, the crawler may use heuristics and/or best practices to determine these attributes (e.g., the page title is typically provided within <title></title> html tags, etc.).

A user of the hosted website may influence the crawl in a variety of manners. For example, on one embodiment, the sitemap protocol may be used, which is a standard for listing contents of a website (e.g., in an XML document) that allows web crawlers to easily discover the pages on a site that the site owner wishes to be indexed for search engines. Thus, where the sitemap protocol is used, the crawler will index only the content specified in the sitemap document.

Additionally, or alternatively the website may specify information that the crawler may recognize while crawling each webpage of the website. For example, the user may explicitly label the structured information sought after by the crawler discussed above. Additionally, the webpages may include further information that may be used for customizing the search engine by the user. For example, the user may insert website specific tags that the crawler may extract and store in the search index. The user may then use those custom tags for modifying behavior of the search engine. Further details related to the specification of this information is provided below.

In one embodiment, the user may specify path exclusions and/or inclusions for the search engine. This user specification may occur before creation of the search engine, or at a later time, as desired. For example, a user may specify that a specific portion of the website be excluded from the crawl and/or in search results. Similarly, the user may wish to restrict the search engine pages that only exist within a certain path, which is known as "whitelisting" (or path inclusion).

As one example, a user may wish to exclude every page within the path www.yourdomain.com/coupons (referred to as the "/coupons" path) to be excluded from the search index. Accordingly, a user can exclude paths via a user interface, such as those described below (e.g., FIG. 3K). For example, the user may choose the exclusion rule he would like to apply: begins with, contains, ends with, or matches regex. The rule may then be applied to the string provided within the field. For example, if the user desires to exclude any URLs that begin with "coupons", the user can choose "begins with" and type "coupons" into the text box. In one embodiment, as the string is typed, the dashboard may display URLs from the associated website that match the exclusion rule being specified so that the user can confirm the correct URLs are being excluded.

As another example, a user may wish to include all pages under the www.yourdomain.com/documentation for a documentation search engine. For this particular search engine, all other pages should be excluded automatically because they are not included in the whitelist. Whitelisted paths can be created within the Swiftype dashboard in a manner similar to that described above. Exemplary user interfaces for path inclusion and exclusion are provided below.

In some embodiments, the creation of the search engine may involve determining the social impact or influence of various pages on the website, e.g., by analyzing how many "likes" or links to webpages of the website occur on the Internet, such as on social media sites. In one particular embodiment, after crawling the website, an address for each crawled webpage may be determined. One or more social media outlets may be accessed to determine whether or not that address has been shared or promoted at the social media website. For example, the Facebook Open Graph™ provided by Facebook may be used to determine the number of "Likes" that have been registered for that address. These references from social media to webpages, such as Facebook® "likes" may be referred to as "social endorsements" or "social signaling" of the webpage(s).

The generated meta data for each webpage may be stored, and then the website's search index may be post-processed to add those metrics as part of each document's schema. Finally, the result ranking function may be influenced by the social values in the schema. In this way, a webpage within a website that has been shared widely on social networks may be ranked higher on any text queries for which it is relevant due entirely to it's social media popularity, rather than any change in its textual relevance. The influence of this "social impact" on search results may be specified or modified by the user of the custom search website (e.g., a manger associated with the hosted website), as discussed below.

In 206, once the search engine is created, or possibly before or while the search engine is being created, code for including the search engine on the hosted website may be automatically generated and provided to the user. In one embodiment, the code may be JavaScript™ code, Flash® provided by Adobe, or any other browser-supported language that the user may include in the website. For example, the custom search website may provide a snippet of code that the user may insert into the hosted website to include a search engine field corresponding to the automatically generated search engine of 204.

In 208, the user may install the search engine according to the following procedure. The user may copy the code of 206 (e.g., the short Javascript snippet) into the source code of the hosted website. Accordingly, when the website is loaded, the code may (1) create a search input box on the page or (2) locate an existing search input box on the page, and attaches its functionality to the located search box.

After installation, when a user of the hosted website types into the search box, the search query may be relayed to the custom search server. While the user is typing, the custom search server may provide search results in an "autocomplete" dropdown box below the search box. In one embodiment, the user may pick one of these search results directly without submitting (pressing enter) the full-text search. However, if the user does submit the full-text search result, the query may be executed by the custom search server and the appropriate set of search results may be returned and rendered on the webpage of the hosted website. If the search engine has been customized, e.g., for the particular search query provided by the user, as discussed below, then the search results for the keyword entered may be customized accordingly.

Figure 3A:
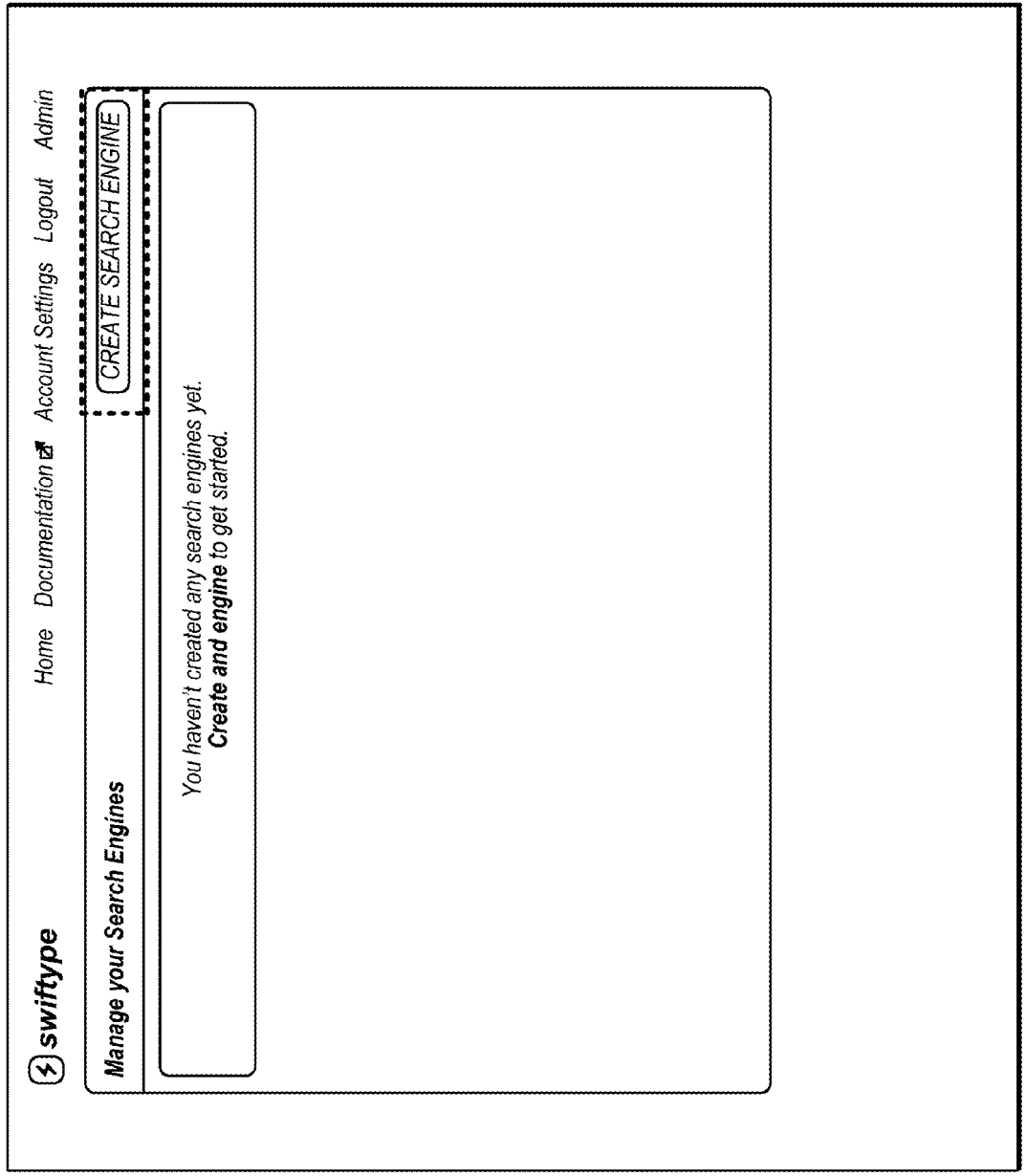
FIGS. 3A-3Q illustrate an exemplary walkthrough corresponding to one embodiment of the method of FIG. 2.

FIGS. 3A-3Q—Exemplary Walkthrough for Automatic Creation of a Search Engine

FIGS. 3A-3Q illustrate exemplary user interfaces corresponding to the method of FIG. 2. These interfaces are provided as examples only and do not limit the scope of the descriptions herein.

As shown in FIG. 3A, a webpage for managing search engines is provided. In this particular webpage, the user does not currently have any search engines and the user may choose to create a search engine by selecting the "create search engine" button highlighted in the upper right corner.

Figure 3B:
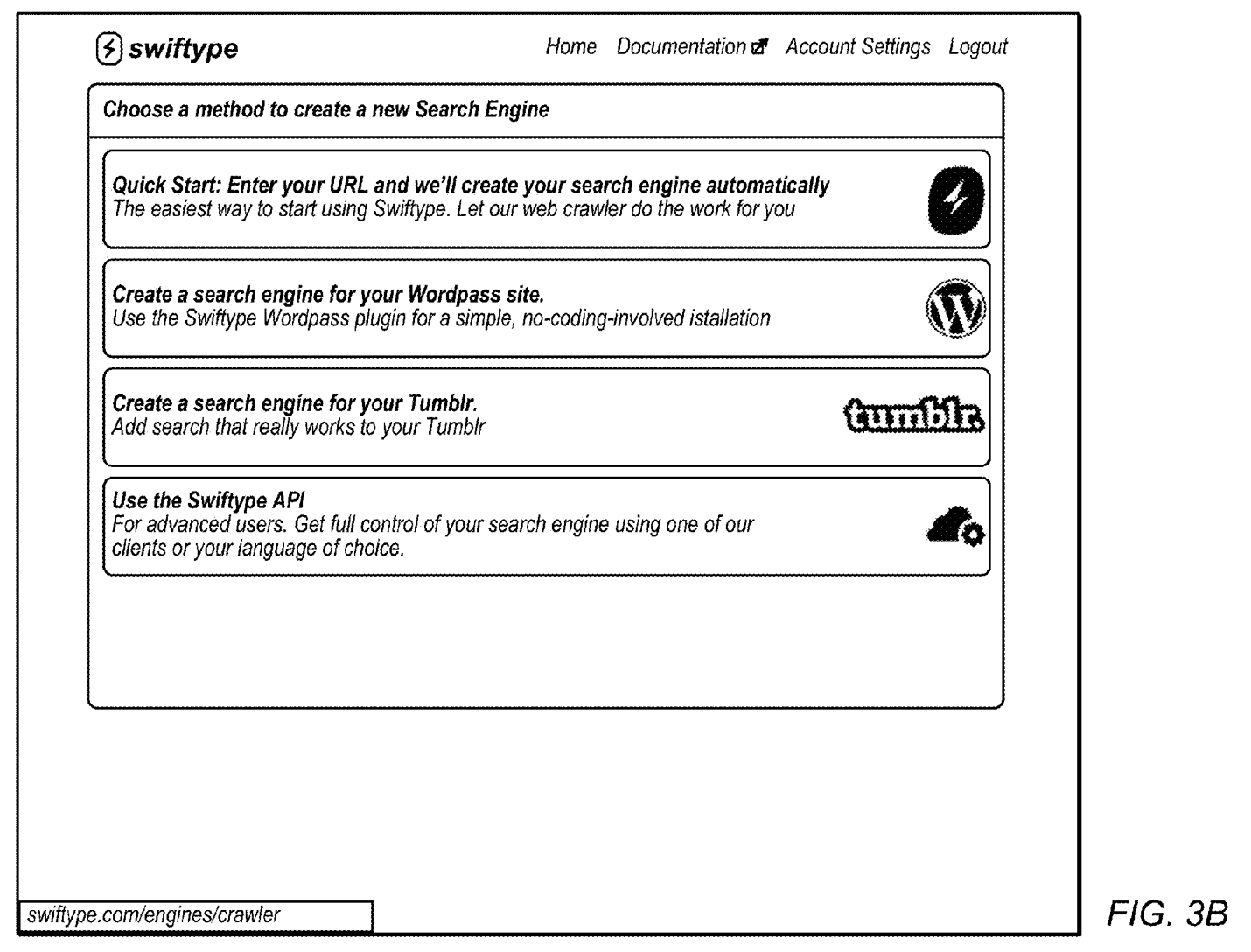

Correspondingly, in FIG. 3B, the user may choose between four different methods for creating the search engine. In the first method, which is selected for the remainder of this walk-through, the user may enter the URL of a website and a search engine is created automatically. In the remaining options, a search engine may be created for a WordPress™ site using a plugin. For example, the user may activate a corresponding search engine plugin using the WordPress™ dashboard. Correspondingly, the plugin may provide data (e.g., via an API) of the WordPress™ site to the custom search server for automatic search engine creation. As another option, a search engine may be created for Tumblr™ sites. In this option, the custom search server may request data for creation of the search engine using the Tumblr™ API. Finally, the user may use an API to have full control of the search engine, for more advanced users. In one embodiment, the search engine may be initially created with little or no data and the API may be used to populate the search engine's data for the website, which may then be used for performing searches. For example, the user may use the API to have full control of the search engine's content schemas, relevance calculations, updates, etc.

Figure 3C:

In FIG. 3C, after choosing the first option, the user may provide a search engine name (in this case "PaulGrahamDotCom") and provide the URL of the website for which the user desires to create a search engine ("http://paulgraham.com"). If the user desires that the search engine be limited to a particular path, the path may specified in the URL at this point. Additionally, multiple URLs may be added for the search engine, as desired. As discussed above, it may also be possible to exclude certain pages or paths at this point, although such exclusions may be specified at a later point. After specifying the desired URLs, the user may select the "create engine" button to begin automatic creation of the search engine.

Figure 3D:
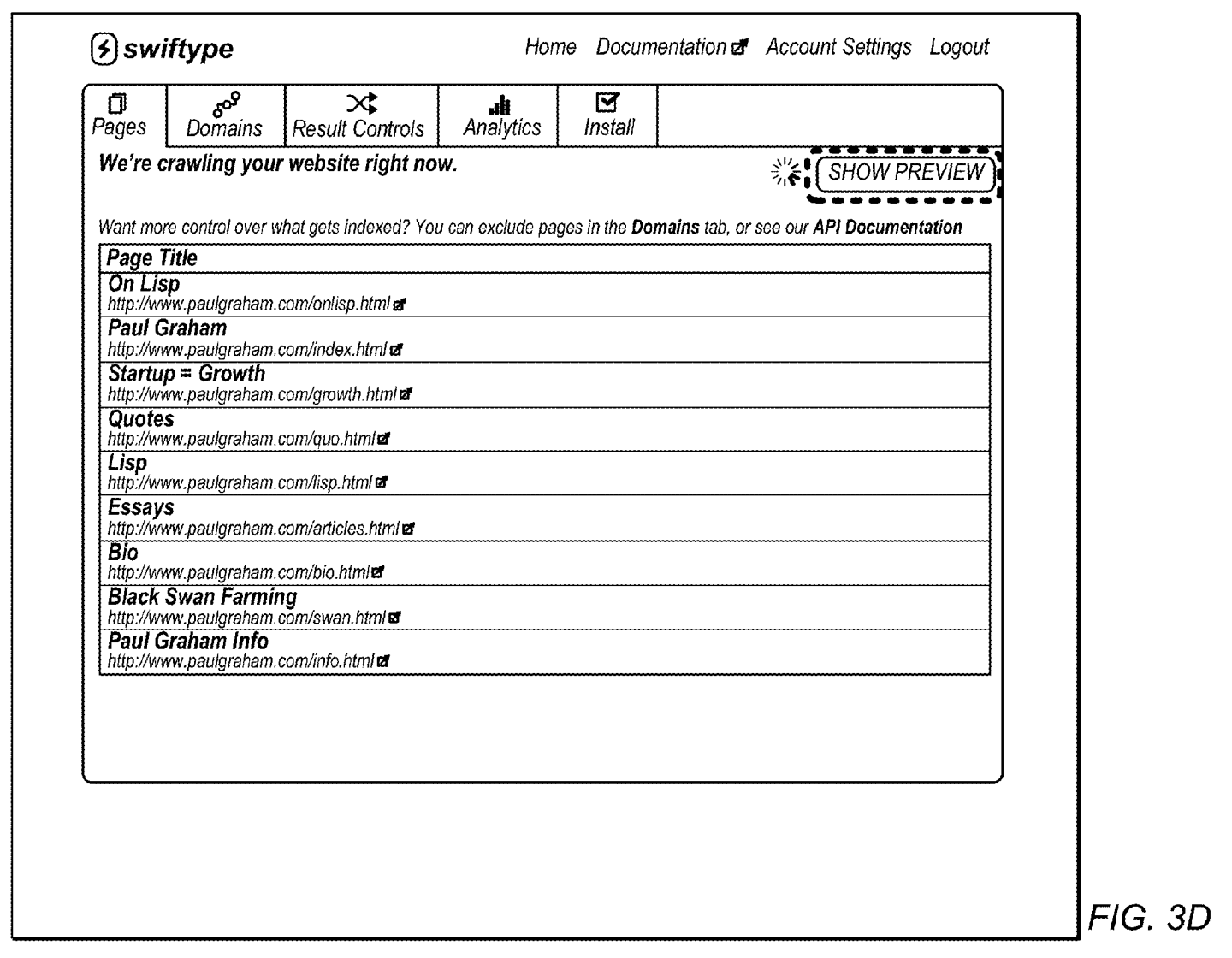

FIG. 3D illustrates an exemplary user interface while the search engine is being created. In this particular example, webpages may appear on the webpage (under the "pages" tab) as they are found and indexed. After completion of the search engine, all of the indexed pages may be listed under this tab. As noted at the top of this page, the user may exclude pages using the "domains" tab. Additionally, the user may be able to view and use a live preview of the search engine on the selected webpage by selecting the "show preview" button.

Figure 3E:
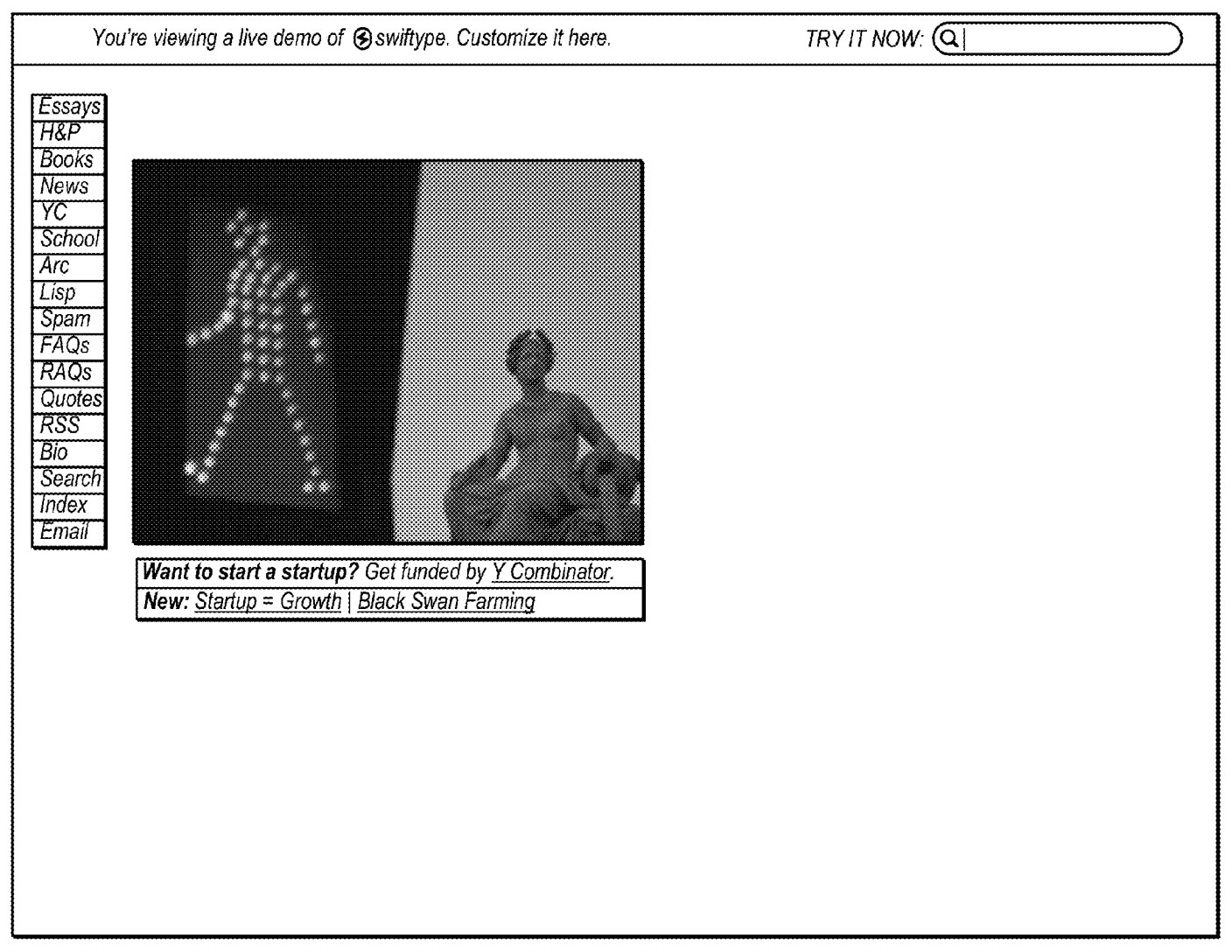

In FIG. 3E, the user has selected the "show preview" button. In response to this selection, the server may automatically retrieve and modify the selected website to insert a search engine input field in the website for the user. In this particular example, the webpage has various links on the left of the page and the search engine input field, which did not previously exist on the website, is inserted at the top right. As indicated to the left of the input field, the user may try the search engine using the live preview, even though the search engine is still being created.

Figure 3F:
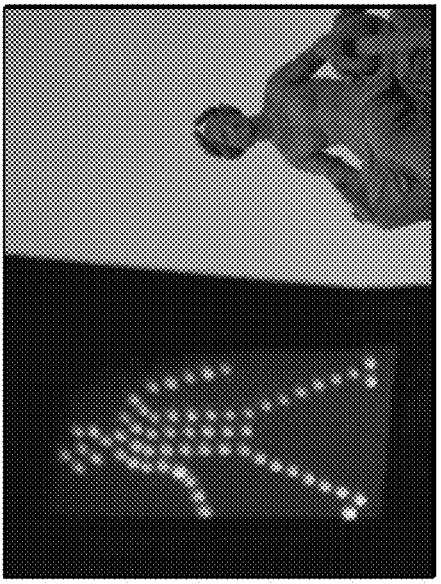

In FIG. 3F, the user has entered the search query "startups". As shown, an autocomplete list of search results is shown beneath the input field, which may be automatically populated with results as the user types in the search query, e.g., automatically updating each time a new character or modification to the search query is type or provided by the user. In this case, various webpages that have been crawled and are deemed relevant to the search query by the search engine are provided in the autocomplete search results.

Figure 3G:
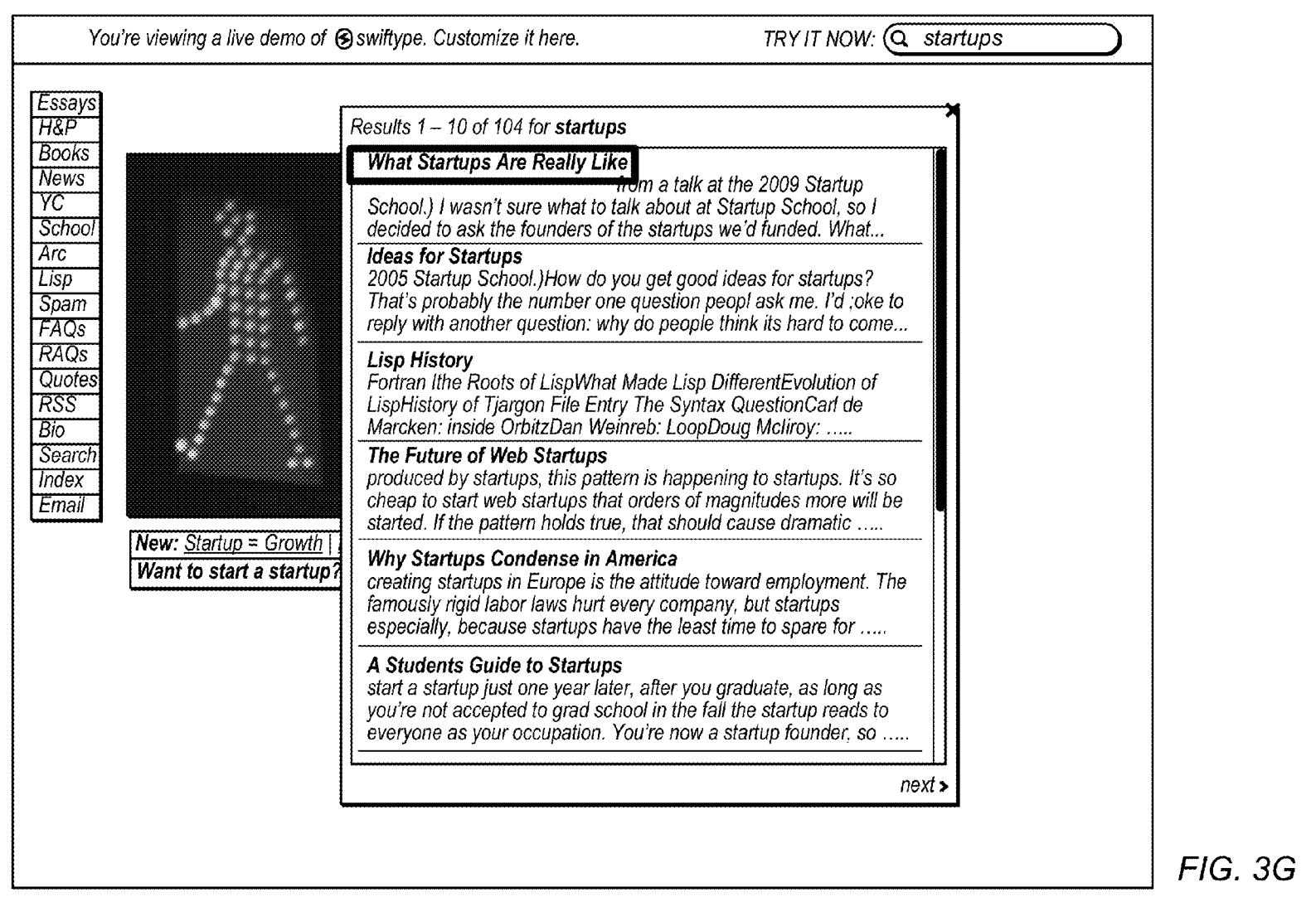

FIG. 3G illustrates the search results of the search query "startups" when the user has pressed "enter" or formally submitted the search query to the search results. In this example, the search results are provided in a pop-up interface over the webpage. In this case, the search results are not provided in a new browser window, although such an option is possible.

In FIG. 3H, the user has selected the top result from the search results and the resulting page is visited in response. Thus, the user is provided a working preview of the search engine while it is being automatically created.

In FIG. 3I, the user has returned to the search engine management page, e.g., during or after completion of the creation of the search engine. In this example, the user has selected the "domains" tab. Here, the user may provide inclusions or exclusions for the search engine. In this particular example, the user is excluding URLs which "begin with" and is typing /yc. As the user is typing the input for the exclusion, the "sample exclusions" section is automatically populated with paths that the exclusion would apply to (e.g., "/ycable.html" or "/ycombinator.html"). In one embodiment, the user may select either of these exclusions to specify a single exclusion or finish the query manually (e.g., leaving it at "/yc" to exclude both), as desired. Additionally, the user may click the "add" to add the exclusion rule to the search engine. These exclusion rules may be listed underneath the "exclusion rule" heading. Additionally, the user may select the "recrawl" button to have the website re-crawled, e.g., to update the search engine using the exclusions.

Figure 3J:
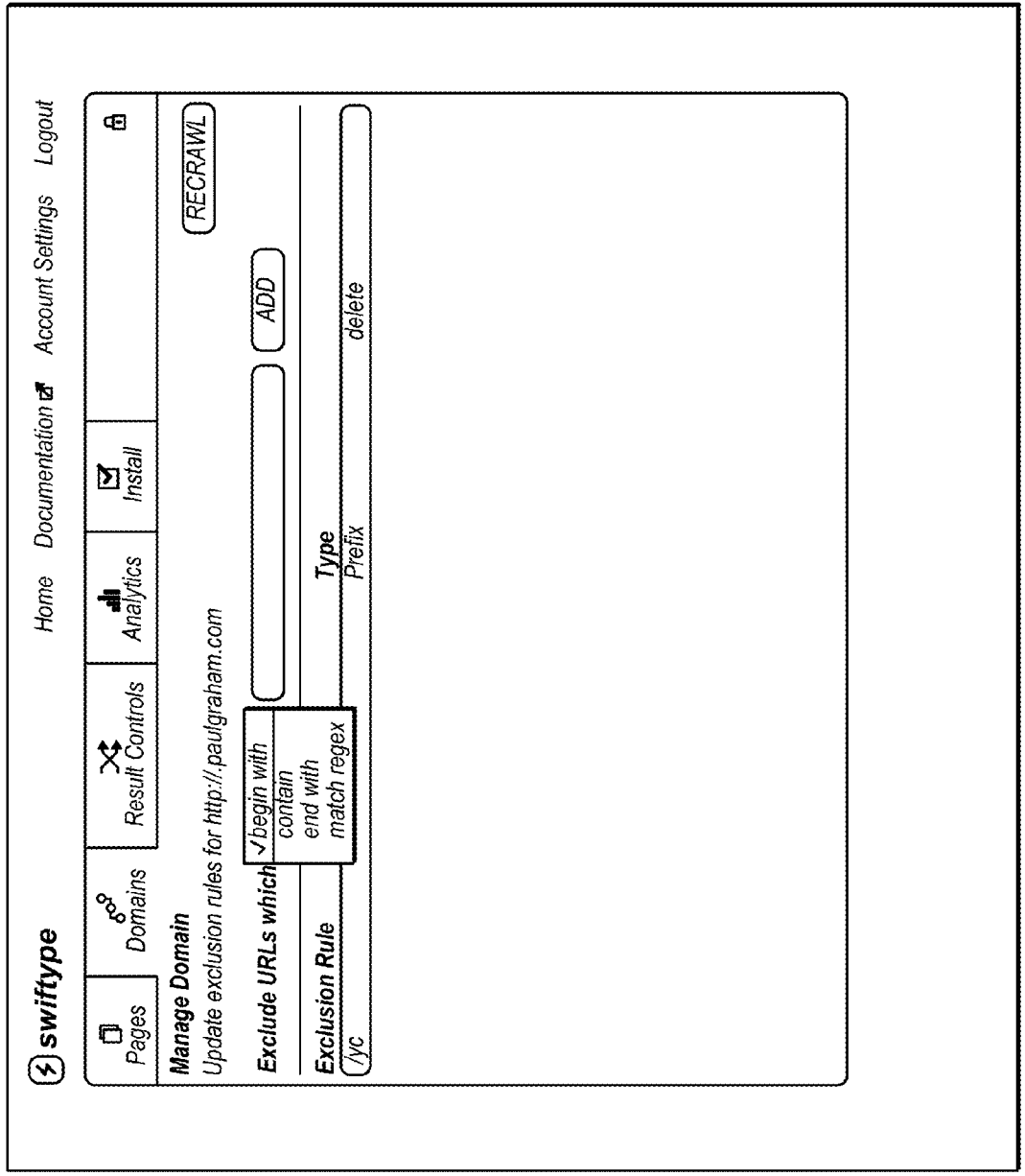

In FIG. 3J, the user has added the "/yc" exclusion and a pop up menu is showing the various exclusion options, e.g., "begin with", "contain", "end with", "match regex", etc.

FIG. 3K illustrates another user interface showing both whitelist (inclusion) rules and blacklist (exclusion) rules. Additionally, the user may specify whether a new rule is for inclusion or exclusion, as desired.

Figure 3L:
Figure 30:

FIG. 3L illustrates the user interface for the "result controls" tab, where the user may customize the search engine. Further discussion of the customization of the search engine is provided below.

FIG. 3M illustrates the user interface for the "analytics" tab, where the user may view various analytics related to a search engine. This particular page is shown for a different search engine than the one created above (having a larger history and having been used for at least 14 days). As shown, the user may view the number of searches over time, the top searches, the top searches with no results, etc. Various other analytics may be provided in this user interface.

Figure 3N:
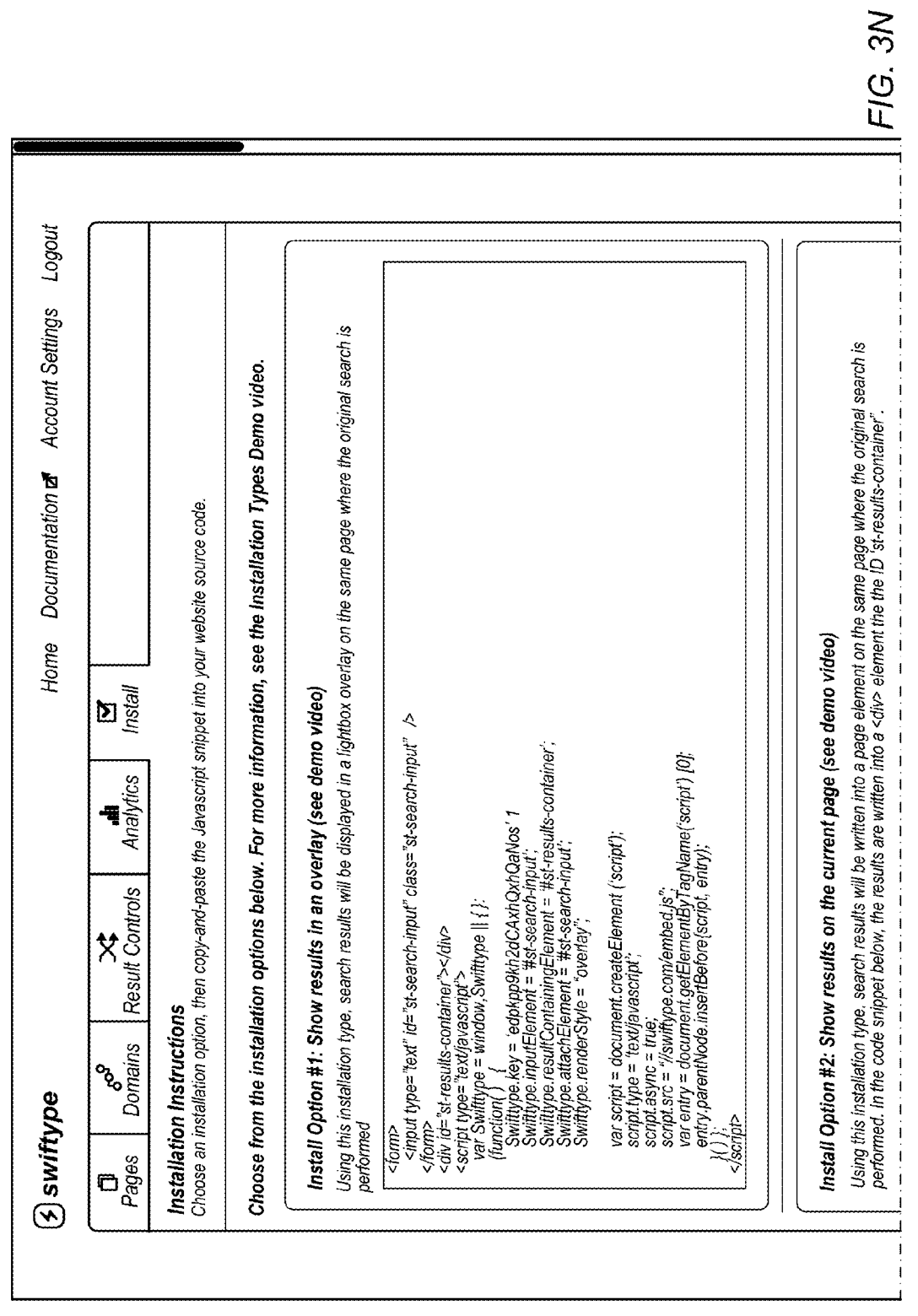

FIG. 3N illustrates the user interface for the "install" tab, which may be displayed during or after search engine creation, as desired. In this user interface, the code for various install options are shown. For the first option, as indicated by the webpage, "using this installation type, search results will be displayed in a lightbox or modal overlay on the same page where the original search is performed". The user may copy and the corresponding code into their website/webpages in order to install the search engine. Other install options are also possible, such as the second option, also shown on the webpage, where "using this installation type, search results will be written into a page element on the same page where the original search is performed". As another example, the user may choose to display search results on a new web page. Further install options are envisioned, such as downloading the results, e.g., in a csv, xml, json, etc. format.

FIG. 3O illustrates an exemplary search engine management page for a user having a plurality of created search engines (e.g., for a plurality of websites).

In FIG. 3P, the user has selected the search engine Paul Graham. Accordingly, the user interface for that website (similar to the ones provided above) is displayed. Here, the "pages" tab is selected and the pages indexed by the search engine are displayed. As also shown, the user can edit information for each page. In this case, the user selects "Trevor with Powerbooks".

Finally, FIG. 3Q illustrates an exemplary user interface for editing individual page details, such as the title of a page, within the "pages" tab of the search engine manager. In this case, the user is editing the page selected in FIG. 3P. In various embodiments, other details of pages may also be edited. Additionally, the top referring queries may also be shown for a selected webpage.

Figure 4:
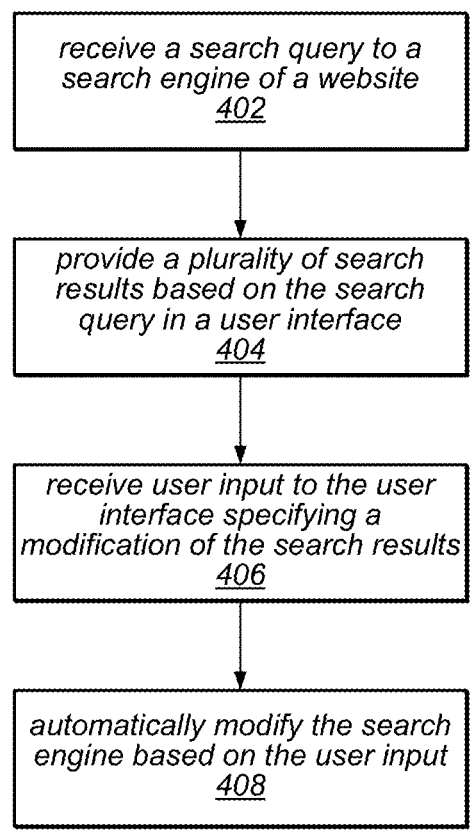
FIG. 4 is a flowchart diagram illustrating one embodiment of a method for automatically modifying a search engine in response to user input.

FIG. 4—Customizing Search Results of a Search Engine in Response to User Input

FIG. 4 illustrates a method for customizing search results of a search engine for a website based on user input. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, a user may provide input specifying a search query. In one embodiment, the user may provide the input using the computer system 10 which may display a website provided by the custom search server 70 (e.g., for managing a search engine created for a hosted website of the website server 60). For example, the user input may be provided to the user interface (e.g., via a webpage) shown in FIG. 3L. In other embodiments, the user input may be provided to an input field for the search engine on the hosted website, as desired. The search engine may have been created according to the method of FIG. 2, described above.

In 404, in response to the search query, the search engine (e.g., executed by the custom search server 70) may generate a plurality of search results and provide the plurality of search results, e.g., in a webpage or pop-up window, to the user.

In 406, the user may provide input to the search results (e.g., directly to the webpage displaying the search results) to specify desired modifications to the search results. For example, the user may specify a change in position of one or more of the search results. In one particular embodiment, a first search result in the list of search results on the screen can be clicked and then dragged to a different position using a "drag-and-drop" user-interaction model. When a result is moved from its original position to a new position in the list, its appearance may change to indicate that it has been "pinned" to the position in which it was just placed. In one embodiment, the user can "unpin" the result to automatically return it to its original position in the list.

Figures 5A, 5B, 5C, 5D:
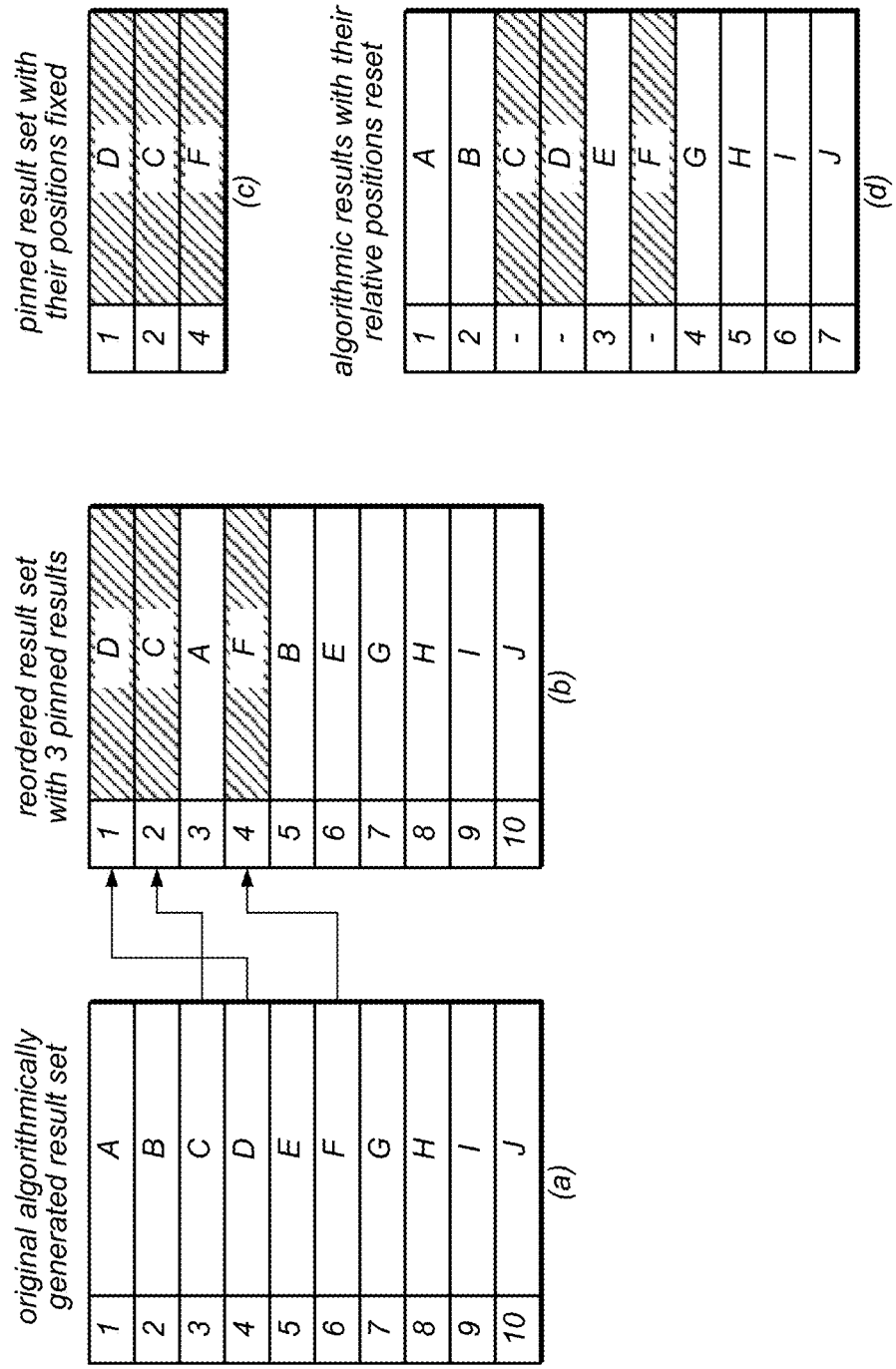
FIGS. 5A-5D are diagrams illustrating exemplary search results with customizations.

FIGS. 5A-5D are exemplary diagrams illustrating an exemplary re-ordering. More specifically, FIG. 5A illustrates an original organic result set, FIG. 5B illustrates the reordered result set after receiving user input, FIG. 5C illustrates the set of pinned results (e.g., which may be stored by the search engine for later search results for the search query), and FIG. 5D illustrates the remaining set of organic results in which the pinned results have been removed from the default ordering, which may also be stored or otherwise noted by the search engine.

Alternatively, or additionally, the user may delete a search result from the plurality of search results. For example, if a result is included in the original list that the user does not wish to have included at all, the user can click an "X" button of that search result. Accordingly, the search results may be removed from the result set for that search query entirely. In one particular embodiment, at this point, the result is placed in a list of "Removed Results" for that specific keyword for future reference (e.g. if the user would like to add it back to the result set at a later time).

The user input may allow the user to provide an additional web page that should be provided in the search results to the search query. In one embodiment, the user may simply provide a URL of a webpage that is desired to be included as a search result. Alternatively, or additionally, the user input may include receiving an additional search query to locate the desired search result. Accordingly, the search engine may provide a second set of search results based on the search query and the user may select the desired additional result from the second set of search results.

For example, if a search result is not included in the returned list of results, the user can add it by clicking an "Add new result" link, e.g., provided in the search results page. This link may provide another user interface that allows the user to find the result they would like to add. Continuing this example, when the user finds the result page and clicks the "Add" button, it may be automatically added to the top of the original search result list. The user may then re-order the result within the rest of the search results (e.g., to place it in the third position), using the techniques described above.

In 408, based on the user input to customize the search results, the search engine may be automatically modified to incorporate the changes indicated by the user input. For example, the positions of any modified results, any deleted results, and/or any added results may be stored for that search query, as indicated above.

While result set customizations may typically be specific to the search query for which they are applied, the customizations may also be used to influence the ordering of search results on other, related keywords. The degree to which keywords are related can be determined by any combination of the following factors:

1) The similarity of their algorithmically-determined search result sets (e.g. two search queries that produce algorithmically-generated search result sets that include the same results in the same order would be deemed very similar);

2) The total number of word tokens shared by the query strings (e.g. "austin convention center" and "austin convention" are more similar than "austin convention center" and "convention rental equipment"); or 3) The similarity of the semantic meanings of the keywords, e.g., terms that are synonymous (e.g., known to be synonymous or which are specified as synonymous, e.g., by the user, for uncommon terms).

In one embodiment, once two keywords are determined to be similar, customizations made to one may influence the ordering of results on the other, the degree of the influence may be determined by the degree of similarity between the two keywords.

In one embodiment, each type of customization may have the following effect on search results for related keywords:

1) Adding a result: increases the relevance of this result to related keyword searches;

2) Removing a result: decreases the relevance of this result to related keyword searches;

3) Moving a result higher in the result set: increases the relevance of this result to related keyword searches; or 4) Moving a result lower in the result set: decreases the relevance of this result to related keyword searches.

Thus, similar search queries may be influenced by the modifications discussed above, e.g., to a lesser degree. For example, where the user has changed the position of a result for the search term "rose", e.g., to a higher position, that same search result may be provided a higher weight for a related search term, such as "flower". Thus, in one embodiment, the exact position may not be remembered for the related search term, but the overall rank may be modified, in this case, with a higher ranking Note that the customizations may affect search queries that are substantially the same (e.g., modifications for "flowers" may also apply to "flower") with the exact same modifications, e.g., where the original results for the two queries were the same or substantially the same (e.g., >90% similarity).

Thus, according to the method of FIG. 4, a search engine that is specific or dedicated to a hosted website may be customized by a user (e.g., a manager or controller of the hosted website) based on user input from that user. In one specific embodiment, the changes may be specific to a search query and may be provided by the user to a user interface showing search results from the search engine based on that search query.

Result of Customizations After Modification to the Hosted Website

As a website changes over time (e.g., pages are added, removed, and content is updated), it is expected that algorithmically-generated search result sets will also change. In the case of result sets that have been customized by the user, this may result in the following scenarios:

1) If a page is removed from the website (and thus the search index), but that page has been customized or "pinned" to a position in one or more result sets, it may be removed from that position in every result set automatically; and 2) If the algorithmically generated set of results for a search query (or keyword) changes, those changes may be reflected immediately, but the customized result for that search term remain unchanged. The algorithmically generated results shuffle "in between" the customized results.

Figures 6A, 6B, 6C, 6D, 6E:
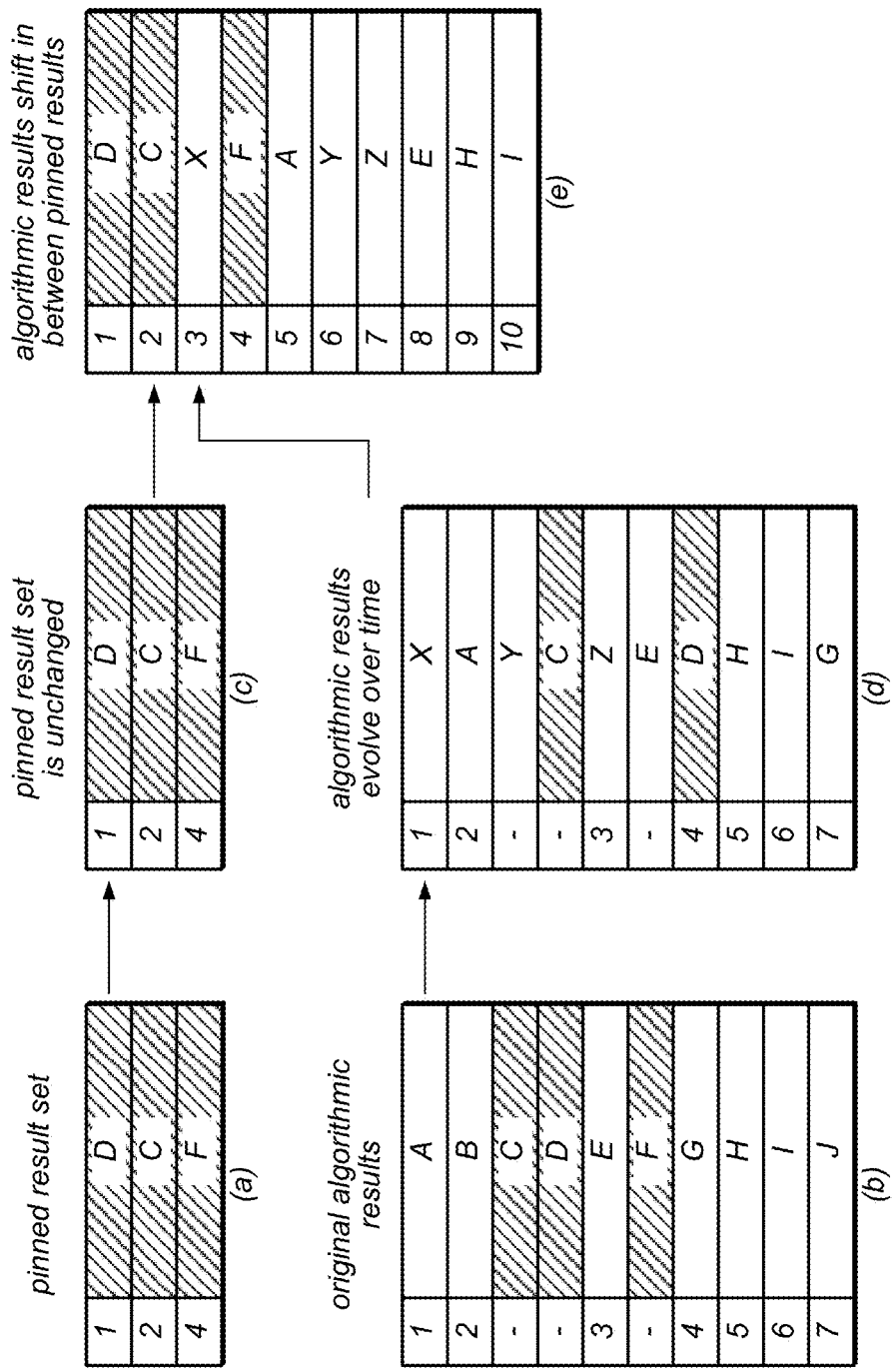
Figures 7A, 7B, 7C, 7D, 7E:
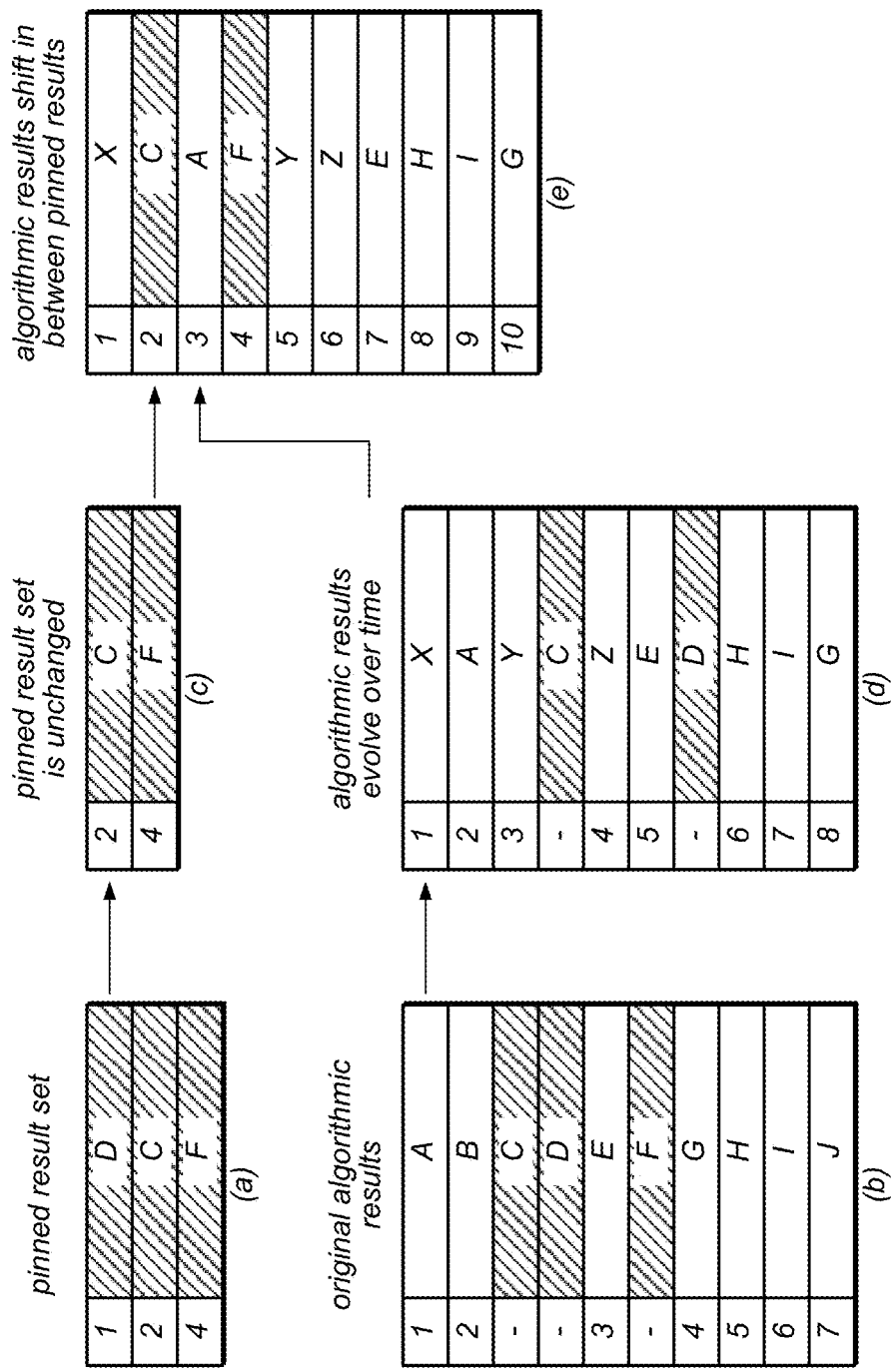

FIGS. 6A-6E illustrates the process of applying modified results to an organic result set that has changed over time, following from the example of FIGS. 5A-5D, discussed above. More specifically, the customized results of 6A remain the same as in FIG. 5C. Additionally, FIG. 6B illustrates the original results, corresponding to FIG. 5A. FIG. 6C shows that the customizations of 6A remain in effect after the webpage (and therefore the algorithmic results) change over time. As shown in FIG. 6D, result F has moved far down the organic result set and new results (X,Y, and Z) have started appearing in the organic result set. Pages X, Y, and Z are likely newly created pages that are also relevant to the original search keyword in this example. Finally, FIG. 6E illustrates how the customized results remain in their designated positions, while the organic search results are shuffled between them. Note that this customization is exemplary only and other customizations are also envisioned as the results change over time. For example, the higher ranked X and Y may have been placed above or within the first four results rather than below them, as desired.

Finally, FIGS. 7A-7E illustrates a similar diagram of changing organic results, but also illustrates the behavior when a customized result (Result D) is removed from the webpage, and thus the search index. In this example, the now deleted result is removed immediately from the customized set of FIG. 7C and the result set of FIG. 7D, and is not superimposed over the organic results in FIG. 7E.

FIGS. 8A-8I—Exemplary Walkthrough for Customizing Search Results

FIGS. 8A-8I illustrate exemplary user interfaces corresponding to one embodiment of the method of FIG. 4. These interfaces are provided as examples only and do not limit the scope of the descriptions herein.

Figure 8A:
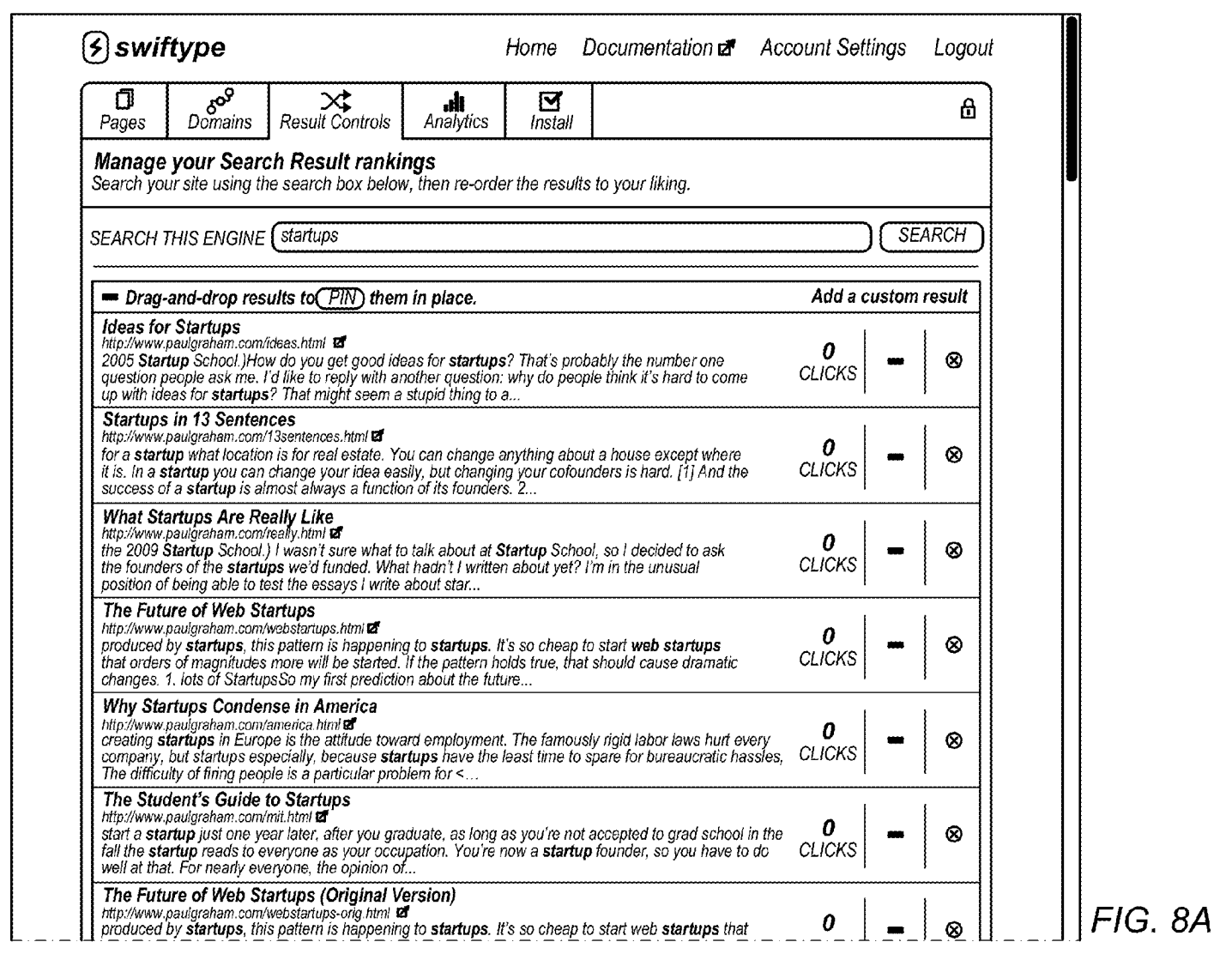
Figure 8D:
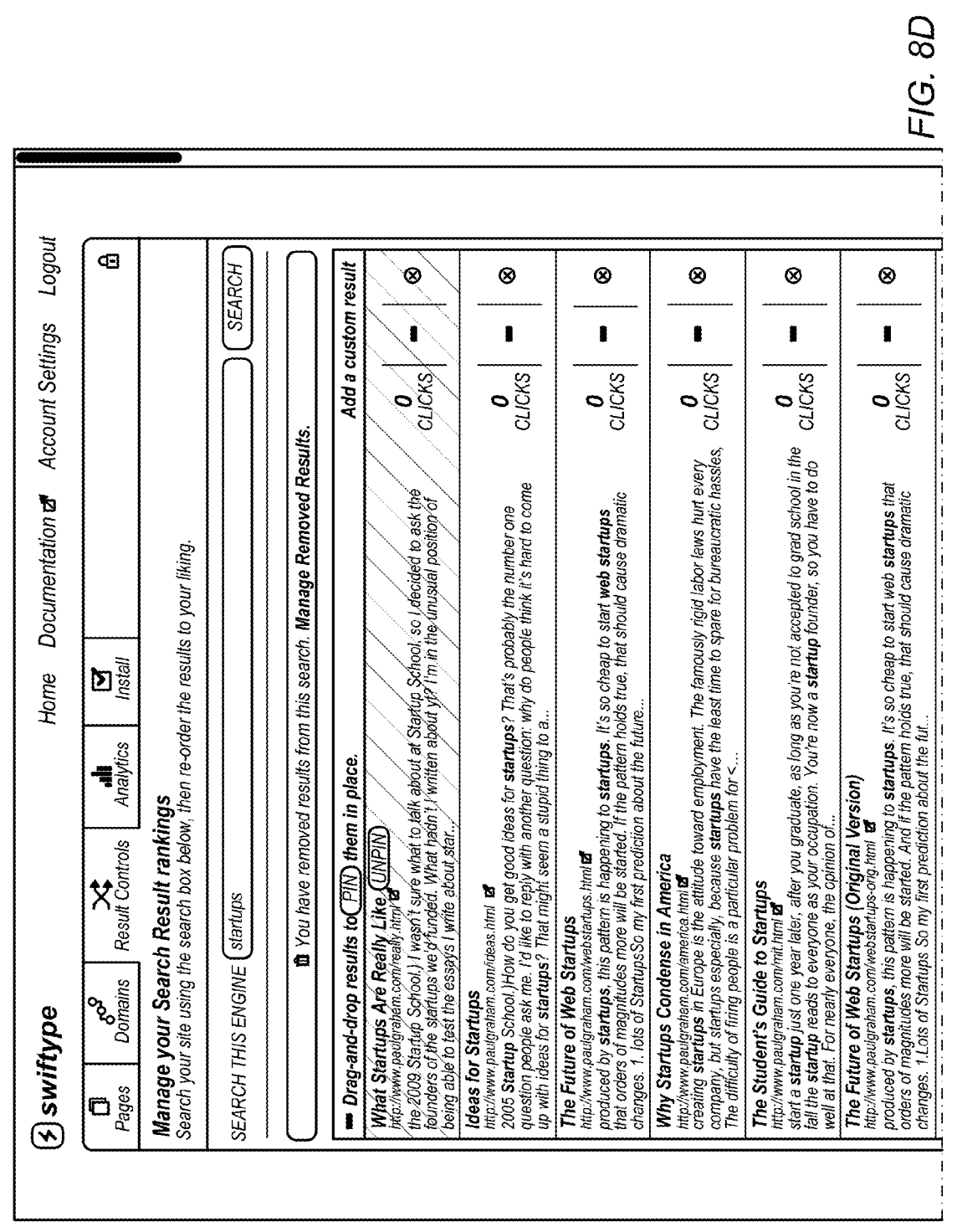

Initially, a user may provide input to the search engine, e.g., using the interface shown in FIG. 3L. In FIG. 8A, the user has provided the query "startups", pressed the "search" button (or otherwise submitted the query), and a plurality of search results are displayed on the webpage. In this particular example, there have been no customizations to the search engine, so the set of results are the unmodified or natural results of the automatically created search engine; however, were there already search result customizations (e.g., such as after the current walkthrough), these customizations may be shown in this interface at this point. As discussed above, the user may customize the search results (and therefore the search engine) by providing input modifying the search results, e.g., changing the order, removing a search result, adding a search result, etc.

In FIG. 8B, the user has dragged the third search result of FIG. 8A from the third position to the first position in the search results. As shown, the prior first and second results are now shown as second and third results. Additionally, there is a visual indication on the first result that it has been customized. More specifically, a new icon or button is displayed ("UNPIN") which allows the user to remove the customized position of the search result. Additionally, the entire results is highlighted with a different color, visually indicating that the result is customized in the search result. Note that these visual indications may only be provided within the search engine management interface—a typically user searching for "startups" after the customization would simply see the customized set of results with no visual indications.

In FIG. 8C, the user has selected the "x" icon to delete or remove the current third search result. Accordingly, this search result is removed in FIG. 8D. As noted in FIG. 8D, the user may "manage removed results" by selecting that link. In that interface, the user may add back previously removed search results, as desired.

Figure 8E:
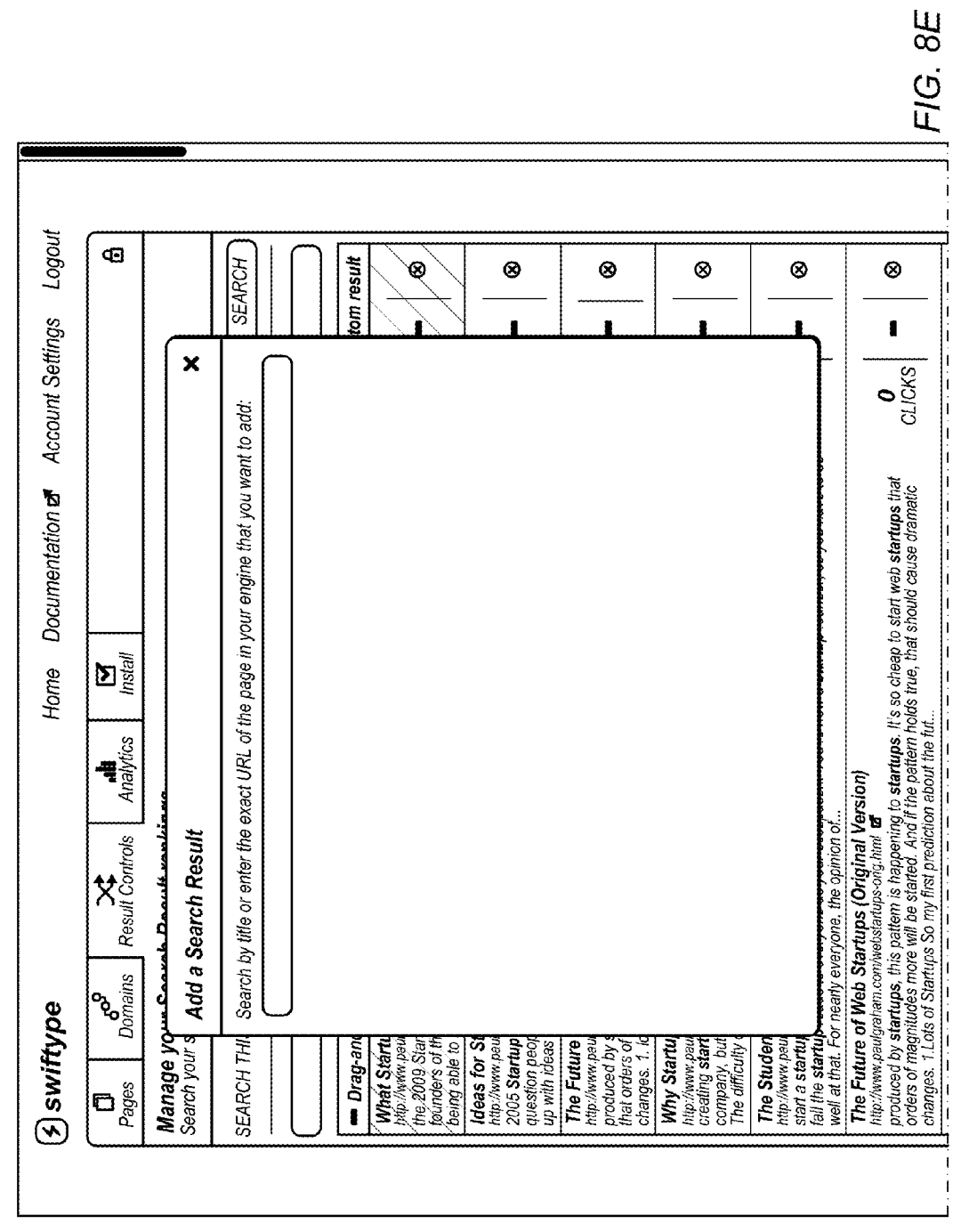

In FIG. 8E, the user has selected the link to "add a custom result". Accordingly, a new interface for adding the new result is displayed. This interface includes a field where the user can provide an exact URL of the page that the user wishes to add to the search results or the user may provide a search query to the field to search for the desired new search result. In the following, a search query is provided since the exact URL case is relatively straight forward.

Figure 8F:
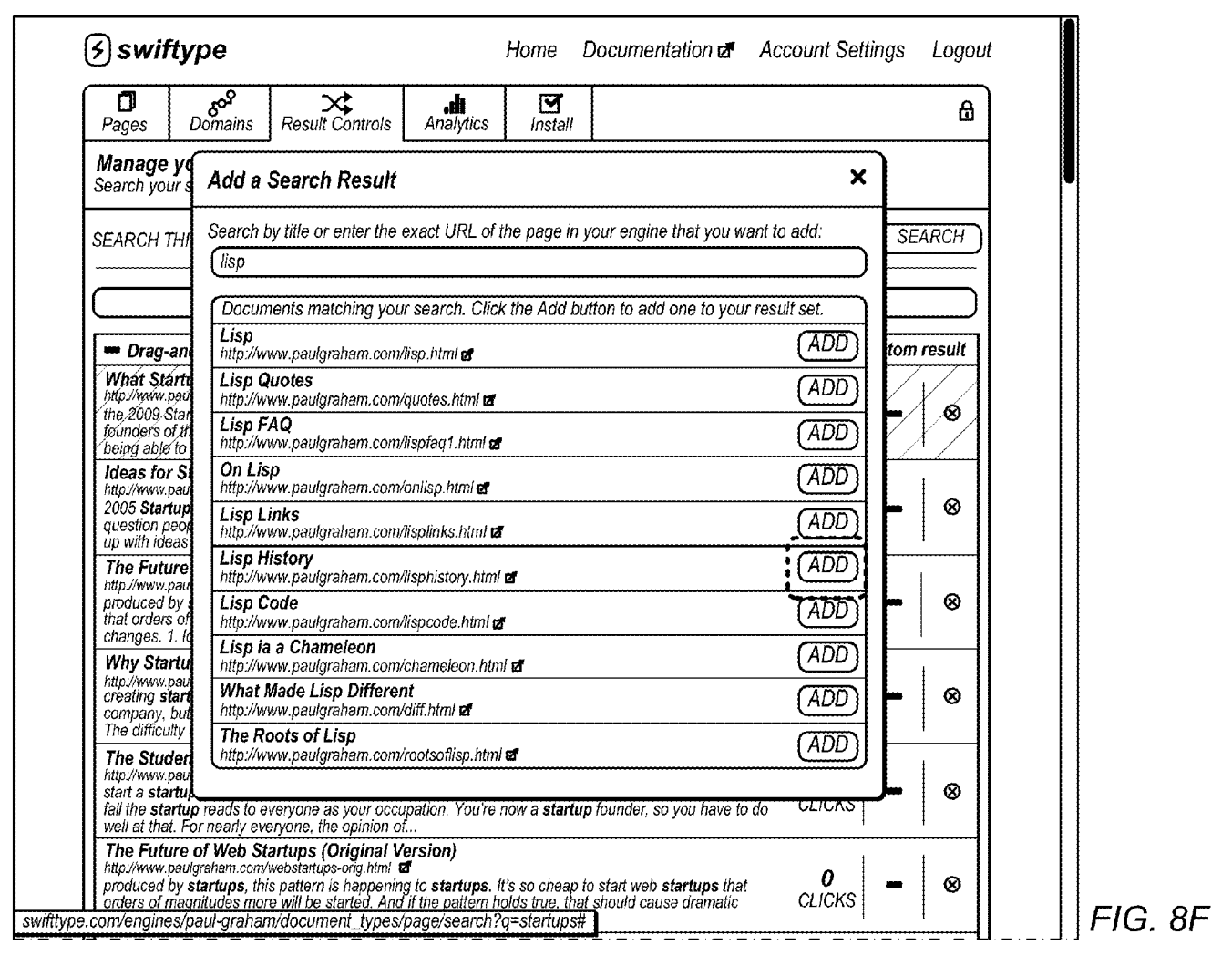
Figure 8G:
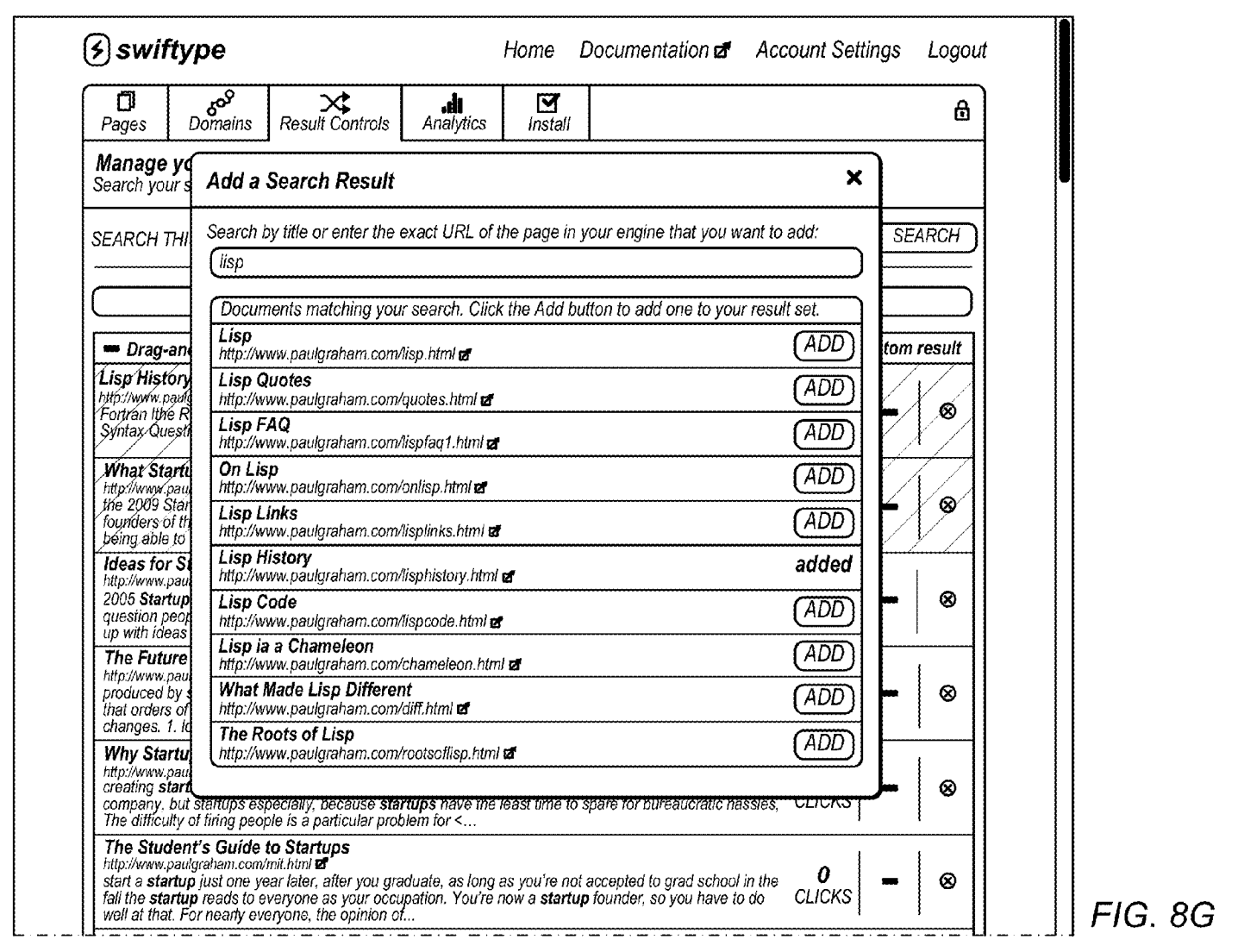

In FIG. 8F, the user has provided the search query "lisp" and a plurality of search results for that query is provided. In this case, the search engine may search for titles of pages (e.g., since the user likely knows the title of the page he wishes to add). However, full-text searching is also envisioned. In this example, the user selects the "add" button for the page "lisp history". Note that the user may add multiple pages within this interface. In FIG. 8G, the text of the interface is changed for the "lisp history" result, indicating that the new search result has been added.

In FIG. 8H, the "lisp history" search result has been added to the top of the search results by default. Similar to the modified position discussed above, the "lisp history" search result is visually indicated as being a customization of the search results.

Figure 8I:
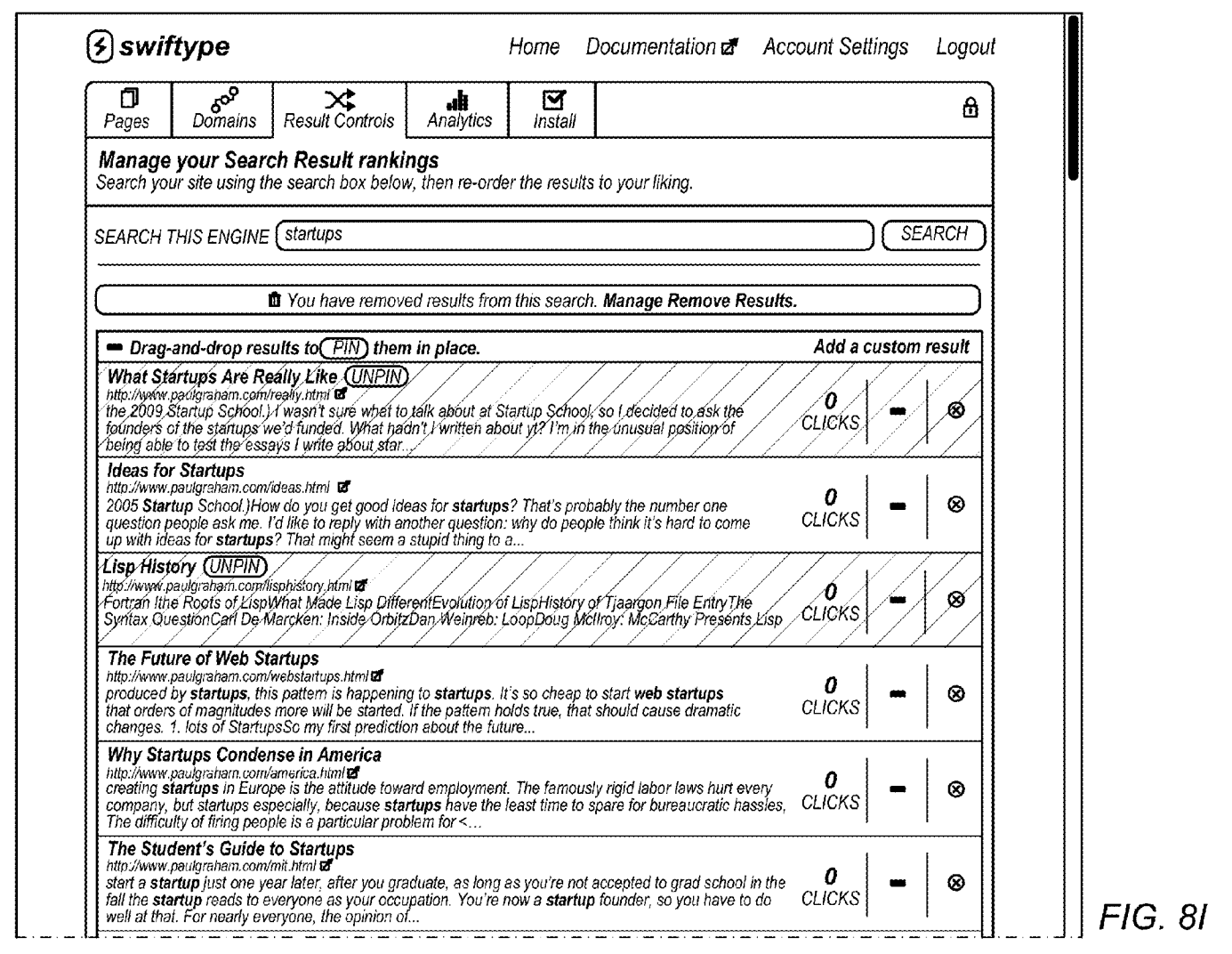

In FIG. 8I, the user has moved the "lisp history" search result to a desired position, in this case, from the first position to the third position. Accordingly, after following the walkthrough of FIGS. 8A-8I, for the search query "startups", an original search result has been moved to a new position, a new search result has been added and pinned to a position, and an original search result has been removed.

As discussed above, these modifications may affect search results for other search queries, e.g., identically or substantially the same for very similar search queries, such as "startup" and with less impact for less related search queries, such as "venture capital".

Figure 9:
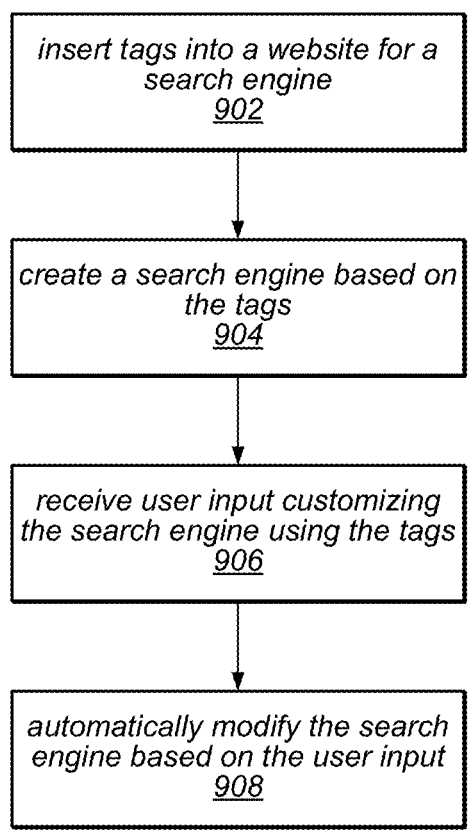
FIG. 9 is a flowchart diagram illustrating one embodiment of a method for customizing a search engine using tags.

FIG. 9—Customizing a Search Engine Using Tags

FIG. 9 illustrates a method for customizing a search engine, e.g., using tags. The method shown in FIG. 9 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 902, a user may insert tags into a website (e.g., the webpages of the website). In some embodiments, these tags may be inserted for the purpose of creating and customizing a search engine (i.e., they may be "search engine tags" that are dedicated for this purpose). Note that these tags may have other uses, e.g., for display within the website, as well. These tags may specify information that the search engine attempts to extract from a webpage by default, such as the title of the webpage, the content of the webpage, etc.

More specifically, in one embodiment, if the user desires direct control of the values extracted from a webpage, he may inform the crawler of the value he would like extracted for each attribute by using search engine-specific meta tags. Said another way, the user can instruct the web crawler to create any arbitrary document schema for each page it crawls on a website by using these meta tags. As the crawler crawls the website to create the search engine (as discussed above), each webpage may be converted into a document or entry, which may represent the webpage within the search engine. Each document may include a number of default fields, e.g., having one or more of the following types:

string: short text content
    text: long text content
    enum: categorical text content (e.g., text that applies a label)
    integer: numerical integer values
    float: floating point numerical values
    date: date/time stamps In the case of the three text field types, the differences may be primarily centered around how the text is analyzed within the search engine itself. By default, the document or information stored for each webpage may have the following fields (type in parens):

title (string)
    sections (array of text fields)
    url (enum)
    body (text)
    type (enum)
    image (enum)
    published_at (date)
    popularity (float)
    info (string)

The following lists exemplary default meta tags that may be inserted in a webpage:

```
<meta property='st:title' content='' />
<meta property='st:section' content='' />
<meta property='st:image' content='' />
<meta property='st:type' content='' />
<meta property='st:info' content='' />
<meta property='st:published_at' content='' />
```

Note that these search engine specific meta tags represent only a subset of the markup-based language that the web crawler understands and can ingest during search engine creation.

In one embodiment, if the user would like for additional fields to be created for the document associated with each webpage, the user can use custom meta tags to create fields arbitrarily, which can later be used for customizing the search engine. The following provides specific examples for custom meta tags in a website:

The user could store the margin made on a product in a meta tag on the webpage:

`<meta name="st:float:margin" content="3.99" />`

This field value would then be available as a ranking metric for any webpage that contained that meta tag. Accordingly, the user could order search result by decreasing margin, using the embodiments discussed below.

Another example is storing the number of "likes", or "upvotes" or the like, a particular webpage has received (e.g., for one or more different social media websites). This could be stored as an integer as follows:

`<meta name="st:integer:likes" content="27" />`

Note that the value of such fields may change dynamically, e.g., as more users "like" or "upvote" the webpage, the meta-tag may be updated, allowing the search engine to remain up-to-date by re-crawling the website. Again, this value could be available to custom result ranking functions, and the user could order results by decreasing "likes", for example. Additionally, the user could potentially combine the two metrics in any way they like. For example, the margin could be counted 4×, the number of likes 2×, and the base text relevance counted 1×.

The following provides code for exemplary meta-tags within a webpage. In these examples, the "name" attribute may be a key of the form:

st:field-type:field-name and the "content" attribute contains the value to be stored in that field.

```
<meta name="st:string:title" content="this is the page title" />
<meta name="st:string:section" content="section 1" />
<meta name="st:enum:image" content="http://www.google.com/images.gif" />
<meta name="st:enum:type" content="category" />
<meta name="st:string:info" content="user_id:1231" />
<meta name="st:text:content" content="this is the body content of the page" />
<meta name="st:integer:upvotes" content="23" />
<meta name="st:float:price" content="3.99" />
<meta name="st:date:publication_date" content="01/12/12" />
```

Meta tags of this form may be stored inside the <head></head> tag of the webpage. Alternatively, if the user does not wish to repeat content from the <body> of the HTML page inside of the <head>, they can use an HTML data-attribute to specify an existing HTML tag as a field in the document. A good example of this use would be for large bodies of text. The website owner typically would not want to repeat large portions of text in both the <body> and in the <head> since it increases the size of the website and therefore increases download time. In that case, the user may add a data attribute to the HTML tag containing the text they wish to be stored in the document. For example:

`<p data-swiftype-text="body">this is the body text</p>`

This would create a field named "body" of type "text", and the value stored would be "this is the body text". As with the explicit meta tags, data attributes can be used to create fields of any supported type, and the name and type may be specified in the data attribute itself. In one embodiment, the attribute may follow this naming convention (where "swiftype" is simply the name of the website providing the custom search engine):

data-swiftype-field_type="field_name".

The value of the field is the content enclosed by the tag marked with the data attribute. Note that for the term "tag", e.g., those specific to the search engine, includes the use of data attributes. Thus, the term "tag" covers both the tags discussed above (e.g., within the head section) as well as the addition of data attributes to existing tags, such as the example where the data attribute is added to the <p> tag.

In 904, the search engine may be automatically created using the tags discussed above. More specifically, as already discussed, the crawler may extract and store the information specified in the tags (e.g., including both default tags that the search engine automatically attempts to populate and custom tags that the search engine would not have attempted to extract by default) for use in the search engine.

In 906, user input may be received to customize the search engine, e.g., based on the tags inserted into the website above. In one embodiment, the user input may be provided to customize the search engine based on the custom tags described above. For example, the custom tags may specify information that the user may be able to create a ranking function around, such as the "likes" or "margin" discussed above, or any desired characteristic. For example, the user may be able to create ranking rules, e.g., for different search situations and/or search queries (or types of search queries), such as in the manner described below in FIG. 10. For example, these ranking rules may modify the weight of various characteristics (e.g., specified by the tags) of the webpage in ranking search results.

Accordingly, in 908, the search engine may be customized according to the specified user input. For example, the ranking rules discussed below may be applied to the search situations specified by the user.

Figure 10:
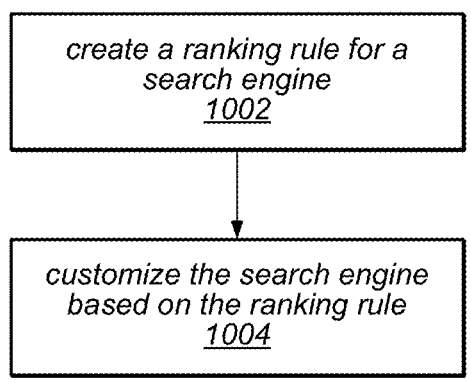
FIG. 10 is a flowchart diagram illustrating one embodiment of a method for customizing a search engine using rules.

FIG. 10—Customizing a Search Engine Using Rules

FIG. 10 illustrates a method for customizing a search engine using tags. The method shown in FIG. 10 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

More specifically, the following discussion may also involve customizations to the search engine using the tags discussed above and/or customizations that do not require such tags. The following provides exemplary details on the search engine as well as possible customizations to the ranking algorithm in producing search results.

In one embodiment, the search engine may generate high-quality algorithmic search results for autocomplete and full-text search based on the structure of an engine's data. By default, algorithmic search results may be ordered according to an underlying ranking function used by the search engine, but users may also be able to create custom ranking functions, e.g., using the tags discussed above.

More specifically, in 1002, a user may specify creation of a ranking rule for a search engine of a website. For example, the user may provide credentials for logging in and may select a particular website or search engine associated with the website. Accordingly, the user may provide user input specifying the ranking rule. For example, the user may specify the importance of various characteristics or attributes of the webpages in determining their order for search queries. These characteristics may be based on the tags discussed above (e.g., where the user has specified the values of the characteristics in desired webpages). Alternatively, or additionally, the characteristics may be based on other factors, e.g., social impact discussed above regarding FIG. 2. In one specific embodiment, the user may specify weights for a plurality of characteristics, e.g., using a graphical user interface for specifying the weights.

Additionally, the user may specify a context for the rule. For example, autocomplete search results may use a different ranking rule than when the search query is submitted. As another example, searches of different types may have different ranking (e.g., using a first rule for product searches, such as one focusing on higher margin, and a second rule for general searches, such as focusing on social impact). Note that the rule may be specified for individual search queries, for a plurality of search queries (e.g., based on type), or any desired search context.

In 1004, the search engine may be automatically customized to apply the specified rules, e.g., within the contexts specified by the user.

Exemplary Embodiments Related to the Method of FIG. 10

The following description provides exemplary embodiments corresponding to the method of FIG. 10.Examples:

1) Many sites use a specific ranking for autocomplete that is separate from full-text search. For example, this ranking may match prefixes on terms and take into account what searches have been performed in the past (the History factor);

2) Sites with heavy social ecosystems may want to include external Popularity factors on relevant pages. For example, a user can specify rules or otherwise modify the search engine to amplify the relevance of a page based on how many Facebook® "likes" and Twitter® "mentions" (among other social endorsements) it has. This way, socially trending pages may be weighted toward the top of result sets.

The following provides an exemplary process for creating a custom ranking function:

1) The user logs into the search engine dashboard and selects a desired search engine;

2) The user selects a "Settings" tab and selects "Result Ranking Functions";

3) The user selects a "Create a New Ranking Function" button;

4) The user names the custom ranking function;

5) The user moves sliding controls for each relevance factor in order to adjust its magnitude relative to the other factors. The search engine may provide built-in factors as well as user-specified relevance factors (e.g., such as those specified in custom tags);

6) The user saves the ranking function, which can now be referenced by the name from Step 4;

7) When submitting searches in the future, the user can have the website elect to apply a custom ranking function by sending the name of the function along with the user-supplied search query. For example, the website may submit a search query that specifies use of a ranking function that is based on the social impact of webpages of the website. Alternatively, the user may simply specify how rules are applied in the search engine dashboard, e.g., specifying a default rule, specifying rules for different contexts, etc.

These factors may be used in weighting documents that match a specified query. They allow operators to customize how much influence data, beyond text, has on result rankings The following specify exemplary relevance factors:
1) Built-In or Default Factors:
   a) Text Relevance: This specifies how closely the text of the document resembles the text of the query;
   b) User Engagement: For a particular query, the search engine measures how much and for how long users interact with chosen results;
   c) Popularity: Each document has its popularity calculated based on site-specific factors as well as external social factors. On-site measurements include interactions such as up-votes or comments. External factors may include Facebook® "Likes", Google+® "Plus Ones", Reddit® posts, and Twitter® "mentions", among other possible social site possibilities;
   d) User History: This predicts what a user is looking for based on his or others' past activity.
2) Custom Factors:
   a) Users can push any custom ranking factors to the search engine via meta-tags or the API;
   b) These factors may be included in the Custom Result Ranking Functions dashboard automatically.

EXAMPLES i) Publishing advertising CPM with documents. This allows the user to boost higher CPM value pages to the top of search result listings.

ii) Commerce applications can publish data such as margins on products to the search engine. They can then use them as a tie-breaker for results with near identical relevance scores so that the more valuable product shows up first.

Figure 11:
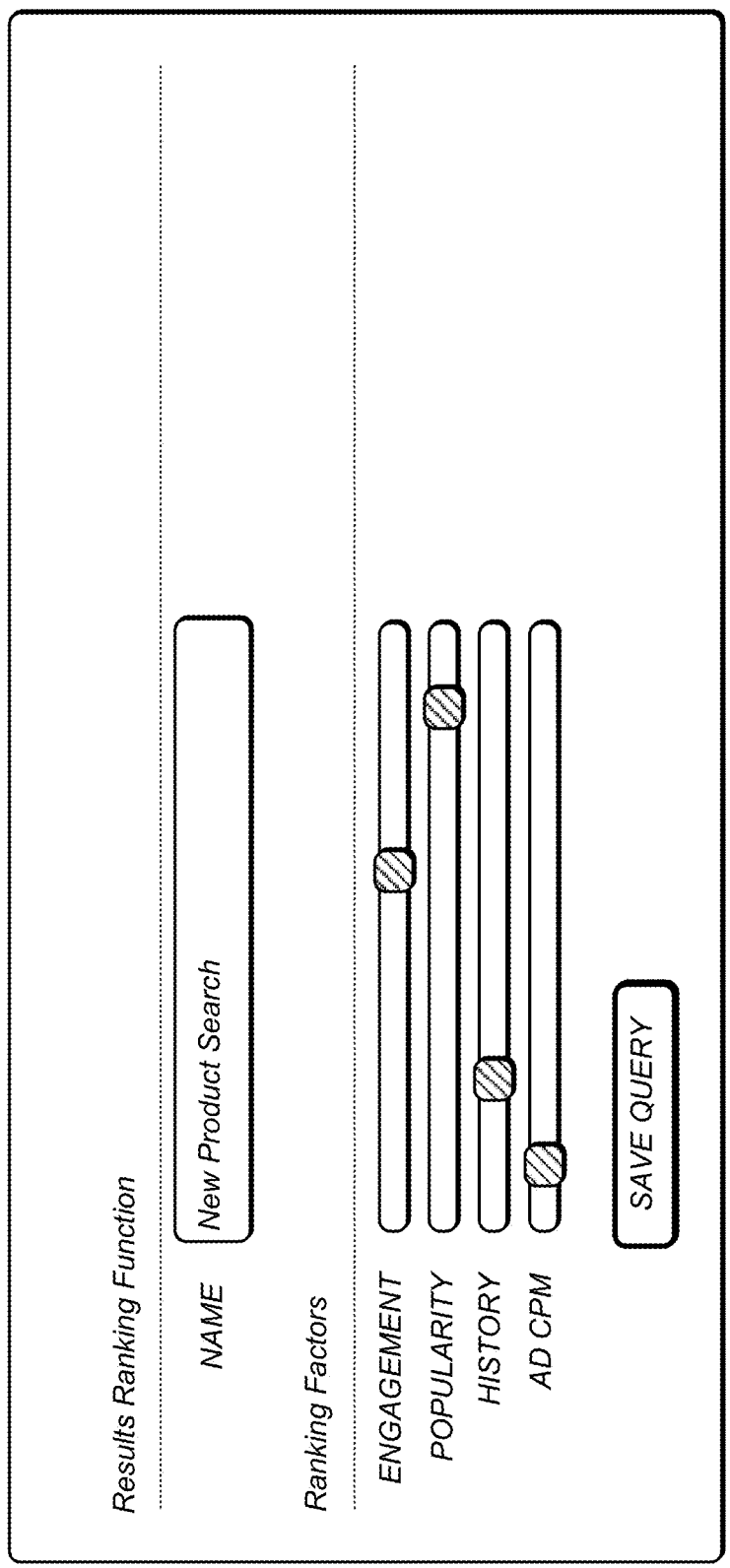

FIGS. 11 and 12 provide exemplary interfaces corresponding to the above-descriptions.

More specifically, FIG. 11 illustrates an exemplary user interface for creating a ranking function or rule. As shown, the user may provide a name for the ranking function and may specify the relative weight of various ranking factors for the function. The factors may be any of those described above, among others. In this exemplary interface, the factors are engagement, popularity, history, and ad CPM. The user has used the sliding bars for each factor to specify relatively high weight for engagement and popularity and relatively low weight for history and ad CPM.

Additionally, FIG. 12 illustrates an exemplary user interface where the user has created custom rules. As shown, the interface lists the factors used by the rules, when they were created, and if they are still active.

Additional Embodiments

The following description provides additional embodiments that may apply to the embodiments and descriptions provided herein. The provided details are exemplary only and other implementations are envisioned.

Page content exclusions and inclusion: Similar to path inclusions and exclusions above, users may have segments of individual pages that they wish to affirmatively include or exclude from the search index. In one embodiment, the search engine crawler may use HTML data attributes to achieve this functionality. For example, users may add the data-swiftype-index attribute to any HTML element. Setting this attribute to "true" may cause all child content to be indexed. Setting this attribute to "false" may prevent the crawler from indexing child content of that element. These attributes can also be nested in the HTML. If there are multiple rules present on the page, all text may inherit its behavior from the nearest parent element with an attribute. Thus, a user can granularly include and exclude elements within each other. If there is text outside of any inclusion/exclusion attributes on the page, it may be treated the opposite of the first-appearing attribute on the page. For example, if the first attribute is data-swiftype-index=false, any text without an attribute may be indexed in the search engine as shown in FIG. 13.

Search Engine Performance Index: After a search engine is installed on a 3rd-party website, usage statistics for the engine may be collected. These statistics may include, but are not limited to, the keywords website users search for, the results they click on after searching for said keywords, the keywords that return zero or few results, and the keywords that result in a very low clickthrough rate to a result page. These statistics may be displayed in the search engine dashboard for the operator to browse and help guide him in choosing the keywords that should be customize. In one particular embodiment, the overall performance of the search engine may be reduced to a floating point number in the range [0,1], which may be updated continually.

Engine Customization Analytics: All of the above customizations have the inherent ability to enhance or harm the performance of a search engine. The search engine (or server associated with the search engine) may track any customizations made to the search engine by users as "Events" and may determine trends in the search engine's performance (e.g., using the Search Performance Index) relative to those Events. For example, if user Jill modifies a Custom Result Ranking Function to weight Ad CPM much higher, weeks later when substantive data has been collected, an alert may appear on the search engine dashboard. It may notify all users that Jill's change on Oct. 3, 2012 caused a 12% drop in User Engagement. There may also be an option to revert such a change in the alert. Conversely, if there is a net-positive effect from a change, another alert may be triggered to notify the users of the success. Similar alerts may be provided for any of various factors (e.g., in addition to user engagement, such as popularity, ad revenue, etc.) or overall performance for the search engine.

Although the embodiments above have been described in considerable detail, numerous variations and modifications will become apparent to those skilled in the art once the above disclosure is fully appreciated. It is intended that the following claims be interpreted to embrace all such variations and modifications.

We claim:
1. A method for modifying a search engine, comprising:
   a computer server creating a search engine for a website, wherein said creating the search engine comprises creating search information for a plurality of webpages of the website, wherein the search information specifies a first set of information for each webpage;
   the computer server providing a search-customization user interface for modifying a ranking function of the search engine for the website, wherein the search-customization user interface specifies one or more first ranking factors;
   the computer server receiving first user input from a user modifying a relative weight of a first ranking factor of the one or more ranking factors, wherein the user is a manager of the website;
   the computer server automatically modifying the ranking function of the search engine to use the relative weight of the first ranking factor based on the first user input;
   after the user inserts one or more first custom tags into source code of at least one webpage of the website, the computer server updating the search information to include information related to the one or more custom tags, wherein the one or more custom tags are dedicated for customizing the search engine of the website;

the computer server providing the search-customization user interface for modifying the ranking function of the search engine for the website, wherein, in addition to the one or more first ranking factors, the search-customization user interface specifies one or more additional ranking factors corresponding to the one or more first custom tags, wherein each additional ranking factor is added to the search-customization user interface for a respective first custom tag inserted into the source code;

the computer server receiving second user input from the user, wherein the second user input specifies modifying a relative weight of a first additional ranking factor of the one or more additional ranking factors;

the computer server automatically modifying the ranking function of the search engine to use the relative weight of the first additional ranking factor based on the second user input;

after automatically modifying the ranking function of the search engine to use the relative weight of the first additional ranking factor, the computer server receiving a search query for the website; and the computer server providing a plurality of search results using the ranking function.

2. The method of claim 1, wherein the search-customization user interface comprises a slider for each ranking factor, wherein the first user input comprises user input to a first slider for the first ranking factor, and wherein the second user input comprises user input to an additional slider for the first additional ranking factor.

3. The method of claim 1, further comprising:
receiving further user input from the user for a second ranking function, wherein the ranking functions are usable for a plurality of different search contexts.

4. The method of claim 3, wherein the different search contexts comprise an autocomplete search context or a full text search context.

5. The method of claim 1, wherein the first one or more custom tags comprise a tag associated with social endorsements on one or more social networks.

6. The method of claim 1, wherein the first one or more custom tags comprise a tag associated with economic attributes of the at least one webpage.

7. The method of claim 1, wherein creating the search information for the plurality of webpages comprises creating a document comprising the search information for each webpage.

8. A non-transitory, computer accessible memory medium storing program instructions for modifying a search engine, wherein the program instructions are executable by one or more processors to:
create a search engine for a website, wherein said creating the search engine comprises creating search information for a plurality of webpages of the website, wherein the search information specifies a first set of information for each webpage;
provide a search-customization user interface for modifying a ranking function of the search engine for the website, wherein the search-customization user interface specifies one or more first ranking factors;
receive first user input from a user modifying a relative weight of a first ranking factor of the one or more ranking factors, wherein the user is a manager of the website;
automatically modify the ranking function of the search engine to use the relative weight of the first ranking factor based on the first user input;
after the user inserts one or more first custom tags into source code of at least one webpage of the website, update the search information to include information related to the one or more custom tags, wherein the one or more custom tags are dedicated for customizing the search engine of the website;
provide the search-customization user interface for modifying the ranking function of the search engine for the website, wherein, in addition to the one or more first ranking factors, the search-customization user interface specifies one or more additional ranking factors corresponding to the one or more first custom tags, wherein each additional ranking factor is added to the search-customization user interface for a respective first custom tag inserted into the source code;
receive second user input from the user, wherein the second user input specifies modifying a relative weight of a first additional ranking factor of the one or more additional ranking factors;
automatically modify the ranking function of the search engine to use the relative weight of the first additional ranking factor based on the second user input;
after automatically modifying the ranking function of the search engine to use the relative weight of the first additional ranking factor, receive a search query for the website; and
provide a plurality of search results using the ranking function.

9. The non-transitory, computer accessible memory medium of claim 8, wherein the search-customization user interface comprises a slider for each ranking factor, wherein the first user input comprises user input to a first slider for the first ranking factor, and wherein the second user input comprises user input to an additional slider for the first additional ranking factor.

10. The non-transitory, computer accessible memory medium of claim 8, wherein the program instructions are further executable to:
receive further user input from the user for a second ranking function, wherein the ranking functions are usable for a plurality of different search contexts.

11. The non-transitory, computer accessible memory medium of claim 10, wherein the different search contexts comprise an autocomplete search context or a full text search context.

12. The non-transitory, computer accessible memory medium of claim 8, wherein the first one or more custom tags comprise a tag associated with social endorsements on one or more social networks.

13. The non-transitory, computer accessible memory medium of claim 8, wherein the first one or more custom tags comprise a tag associated with economic attributes of the at least one webpage.

14. The non-transitory, computer accessible memory medium of claim 8, wherein creating the search information for the plurality of webpages comprises creating a document comprising the search information for each webpage.

15. A search engine system, comprising:
one or more processors; and
one or more memory mediums couples to the one or more processors, wherein the one or more memory mediums store program instructions for modifying a search engine, wherein the program instructions are executable by the one or more processors to:
create a search engine for a website, wherein said creating the search engine comprises creating search information for a plurality of webpages of the website, wherein the search information specifies a first set of information for each webpage;

provide a search-customization user interface for modifying a ranking function of the search engine for the website, wherein the search-customization user interface specifies one or more first ranking factors;

receive first user input from a user modifying a relative weight of a first ranking factor of the one or more ranking factors, wherein the user is a manager of the website;

automatically modify the ranking function of the search engine to use the relative weight of the first ranking factor based on the first user input;

after the user inserts one or more first custom tags into source code of at least one webpage of the website, update the search information to include information related to the one or more custom tags, wherein the one or more custom tags are dedicated for customizing the search engine of the website;

provide the search-customization user interface for modifying the ranking function of the search engine for the website, wherein, in addition to the one or more first ranking factors, the search-customization user interface specifies one or more additional ranking factors corresponding to the one or more first custom tags, wherein each additional ranking factor is added to the search-customization user interface for a respective first custom tag inserted into the source code;

receive second user input from the user, wherein the second user input specifies modifying a relative weight of a first additional ranking factor of the one or more additional ranking factors;

automatically modify the ranking function of the search engine to use the relative weight of the first additional ranking factor based on the second user input;

after automatically modifying the ranking function of the search engine to use the relative weight of the first additional ranking factor, receive a search query for the website; and provide a plurality of search results using the ranking function.

16. The search engine system of claim 15, wherein the search-customization user interface comprises a slider for each ranking factor, wherein the first user input comprises user input to a first slider for the first ranking factor, and wherein the second user input comprises user input to an additional slider for the first additional ranking factor.

17. The search engine system of claim 15, wherein the program instructions are further executable to:
receive further user input from the user for a second ranking function, wherein the ranking functions are usable for a plurality of different search contexts.

18. The search engine system of claim 17, wherein the different search contexts comprise an autocomplete search context or a full text search context.

19. The search engine system of claim 15, wherein the first one or more custom tags comprise a tag associated with social endorsements on one or more social networks.

20. The search engine system of claim 15, wherein the first one or more custom tags comprise a tag associated with economic attributes of the at least one webpage.

\* \* \* \* \*